United States Patent
Wirola et al.

(10) Patent No.: US 10,564,252 B2
(45) Date of Patent: Feb. 18, 2020

(54) FINGERPRINT COLLECTION/PROVISION CONTROL BASED ON DETECTED ERRORS

(71) Applicant: HERE GLOBAL B.V., Eindhoven (NL)

(72) Inventors: Lauri Aarne Johannes Wirola, Tampere (FI); Tommi Antero Laine, Tampere (FI)

(73) Assignee: HERE Global B.V., Eindhoven (NL)

( * ) Notice: Subject to any disclaimer, the term of this patent is extended or adjusted under 35 U.S.C. 154(b) by 445 days.

(21) Appl. No.: 15/321,229

(22) PCT Filed: Jun. 23, 2014

(86) PCT No.: PCT/IB2014/062530
§ 371 (c)(1),
(2) Date: Dec. 22, 2016

(87) PCT Pub. No.: WO2015/198090
PCT Pub. Date: Dec. 30, 2015

(65) Prior Publication Data
US 2017/0160373 A1   Jun. 8, 2017

(51) Int. Cl.
*H04W 24/00* (2009.01)
*G01S 5/02* (2010.01)

(52) U.S. Cl.
CPC .................. *G01S 5/0252* (2013.01)

(58) Field of Classification Search
CPC ....... H04W 64/00; H04W 4/02; H04W 88/02; H04W 88/06; H04W 36/30; H04W 76/02; H04W 92/02; H04W 24/00
(Continued)

(56) References Cited

U.S. PATENT DOCUMENTS 7,551,922 B2   6/2009 Roskowski et al.
9,121,924 B2 * 9/2015 Ng .................... H04W 64/00
(Continued)

FOREIGN PATENT DOCUMENTS

KR    2009/0040102 A    4/2009
WO    WO 2007/040351 A1    4/2007
(Continued)

OTHER PUBLICATIONS

International Search Report and Written Opinion from International Patent Application No. PCT/IB2014/062530 dated Mar. 27, 2015.
(Continued)

*Primary Examiner* — Temica M Beamer
(74) *Attorney, Agent, or Firm* — Alston & Bird LLP

(57) ABSTRACT

It is disclosed to one of produce and obtain at least one set of fingerprint information, wherein the at least one set of fingerprint information comprises identification information for identifying at least one of a radio node and a cell observed at at least one position of the device, to perform at least one check at least with the at least one set of fingerprint information to determine if the at last one set of fingerprint information contains at least one error; and to control a process for at least one of collecting and providing fingerprint information based at least on a result of the at least one check. It is further disclosed to one of provide and cause to be provided a representation of at least one check to be performed at least with at least one set of fingerprint information to determine if the at least one set of fingerprint information contains at least one error, wherein the at least one set of fingerprint information comprises identification information for identifying at least one of a radio node and a cell observed at at least one position of the device, and to one of provide and cause to be provided a representation of a controlling of a process for at least one of collecting and
(Continued)

providing fingerprint information to be exerted based at least on a result of the at least one check. Also disclosed are according apparatuses, and an according system, an according computer program and an according computer readable storage medium storing the computer program.

21 Claims, 10 Drawing Sheets

(58) Field of Classification Search
USPC .............................. 455/456.1, 456.5, 422.1
See application file for complete search history.

(56) References Cited

U.S. PATENT DOCUMENTS

| | | | | |
|---|---|---|---|---|
| 9,167,386 | B2 * | 10/2015 | Valaee | .................. G01S 5/0252 |
| 10,049,455 | B2 * | 8/2018 | Wirola | .................. G01C 21/20 |
| 2010/0093368 | A1 | 4/2010 | Meyer et al. | |
| 2012/0184219 | A1 | 7/2012 | Richardson et al. | |
| 2012/0240206 | A1 | 9/2012 | Hoffman | |
| 2012/0290576 | A1 | 11/2012 | Amorim | |
| 2013/0311468 | A1 | 11/2013 | Hjelm et al. | |
| 2015/0100743 | A1 | 4/2015 | Wirola et al. | |
| 2019/0200318 | A1 | 6/2019 | Wirola et al. | |

FOREIGN PATENT DOCUMENTS

| | | |
|---|---|---|
| WO | WO 2013/136123 A1 | 9/2013 |
| WO | WO 2013/136128 A1 | 9/2013 |

OTHER PUBLICATIONS

International Preliminary Report on Patentability from corresponding International Patent Application No. PCT/IB2014/062530 dated Dec. 27, 2016.

* cited by examiner

US 10,564,252 B2

FINGERPRINT COLLECTION/PROVISION CONTROL BASED ON DETECTED ERRORS

FIELD OF THE DISCLOSURE

The invention relates to the field of radiomap-based positioning of mobile devices, and more specifically to controlling the collection and/or provision of fingerprint information by devices in the context of generating and/or updating radiomaps.

BACKGROUND

Modern global radiomap-based positioning technologies are based on generating large global databases containing information on cellular and/or non-cellular signals receivable from radio nodes such as base stations or access points at a plurality of positions. The information may originate entirely or partially from users of these positioning technologies acting as data collectors (so-called "crowd-sourcing" of information collection).

The data provided by these data collectors is typically in the form of "fingerprints", which at least contain information on measurements taken from the data collector's cellular and/or non-cellular radio interfaces at a position of the data collector. A fingerprint may further contain the data collector's position that is measured or estimated based on, e.g., received satellite signals of a global navigation satellite system (GNSS). Alternatively, the position of the data collector may be determined and associated with the fingerprint by another entity, e.g. a server. In the case of measurements on cellular signals, the results of the measurements may contain a system-wide and/or local identification of the cellular communication system cells observed, their signal strengths and/or pathlosses and/or timing measurements like timing advance (TA) or round-trip time (RTT). For measurements on wireless local area network (WLAN) signals, as an example of signals of a non-cellular network, the results of the measurements may contain a basic service set identification (BSSID), like the medium access control (MAC) address of observed access points, and/or the service set identifier (SSID) of the observed access points, and/or the signal strength of received signals (received signal strength indication RSSI or physical Rx level in dBm with a reference value of 1 mW, etc.), and/or pathloss measurements/estimates and/or timing measurements (like e.g. RTT).

This fingerprint information may then be transferred to a server or cloud, where the data (usually from a multitude of users) may be collected and where a radiomap for positioning purposes may be generated and/or updated based on the data. Such a radiomap can for instance comprise estimates for respective coverage areas of one or more radio nodes and/or radio channel models for these one or more radio nodes.

In the end, this radiomap may be used for estimating the position of mobile devices. This may function in two modes. The first mode is the device-assisted mode, in which the mobile device performs the measurements of the cellular and/or non-cellular air interface, provides the measurements to the remote server, which in turn, based on the radiomap, determines and provides the position back to the mobile device. The second mode is the device-based mode, in which the mobile device has a local copy of the radiomap (or only a subset of the global radiomap). This subset copy is downloaded by the mobile device from a remote server for the area of interest (e.g. a small area around the current location, for a whole country, or so). This subset copy can of course also be pre-installed to the mobile device in the factory, but may then need to be refreshed at some point.

SUMMARY OF SOME EXAMPLE EMBODIMENTS OF THE INVENTION

One issue in crowd-sourced information collection systems may be the quality of the collected data. In order to get the best coverage and to be able to react quickly on the changes in the radio landscape, it may be advantageous to harvest data from as many different devices as possible. However, this may also introduce risks—as the fingerprint collection and/or provision software (e.g. in the form of an agent) is distributed to more and more devices, there may also be more and more devices with software/hardware errors (e.g. concerning erroneous handling of radio node identifiers and/or cell identifiers) that may cause the fingerprint information to be of low quality and thus to adversely affect the quality of the radiomaps generated and/or updated based on this fingerprint information.

An example embodiment of a method according to a first aspect of the invention is disclosed, which comprises one of producing and obtaining at least one set of fingerprint information, wherein the at least one set of fingerprint information comprises identification information for identifying at least one of a radio node and a cell observed at at least one position of the device; performing at least one check at least with the at least one set of fingerprint information to determine if the at last one set of fingerprint information contains at least one error; and controlling a process for at least one of collecting and providing fingerprint information based at least on a result of the at least one check.

Furthermore, an example embodiment of a method according to a second aspect of the invention is disclosed, which comprises one of providing and causing to be provided a representation of at least one check to be performed at least with at least one set of fingerprint information to determine if the at least one set of fingerprint information contains at least one error, wherein the at least one set of fingerprint information comprises identification information for identifying at least one of a radio node and a cell observed at at least one position of the device, and one of providing and causing to be provided a representation of a controlling of a process for at least one of collecting and providing fingerprint information to be exerted based at least on a result of the at least one check.

Moreover, for both the first aspect and the second aspect of the invention (referred to as the "respective aspect" below), the following is disclosed:

An example embodiment of a computer program according to the respective aspect of the invention, the computer program when executed by a processor causing an apparatus to perform the presented example embodiment of the method according to the respective aspect of the invention.

An example embodiment of a computer readable storage medium according to the respective aspect of the invention, in which the presented example embodiment of the computer program according to the respective aspect of the invention is stored. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

An first example embodiment of an apparatus according to the respective aspect of the invention, which is configured to perform or comprises respective means for performing the method according to the presented example embodiment of the method according to the respective aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means.

A second example embodiment of an apparatus according to the respective aspect of the invention, comprising at least one processor and at least one memory including computer program code, the at least one memory and the computer program code configured to, with the at least one processor, cause an apparatus at least to perform the presented example embodiment of the method according to the respective aspect of the invention.

Any of the disclosed example embodiments of apparatuses may be a module or a component for a device, for example a chip. Alternatively, any of the mentioned apparatuses may be a device, for instance a server or a mobile device. Any of the disclosed example embodiments of apparatuses may comprise only the indicated components or may further comprise one or more additional components.

Moreover, a first example embodiment of a system according to the invention is disclosed, comprising the presented first example embodiment of an apparatus according to the first aspect of the invention and the presented first example embodiment of an apparatus according to the second aspect of the invention.

Furthermore, a second example embodiment of a system according to the invention is disclosed, comprising the presented second example embodiment of an apparatus according to the first aspect of the invention and the presented second example embodiment of an apparatus according to the second aspect of the invention.

Example embodiments of both aspects of the invention pertain to a check of at least one set of fingerprint information for at least one error, and to a control of a process for at least one of collecting and providing fingerprint information under consideration of the at least one error. The first aspect of the invention is directed to the check and the control itself, which may for instance take place on the device (e.g. a mobile device like for instance a mobile phone) at which the fingerprint information is collected, whereas the second aspect of the invention is directed to providing, e.g. by a server, a representation of the check and a representation of the control, for instance to the device at which the fingerprint information is collected, or to a component thereof. The representation of the check and the representation of the control may for instance be one or more computer programs. The representation of the check and the representation of the control may alternatively be a checking rule and an according controlling rule.

The checking and the controlling may operate on different sets of fingerprint information, or at least partially on the same set(s) of fingerprint information. The at least one check may for instance be performed as a (e.g. regular) background task that performs the at least one check at least partially in parallel to the process of at least one of collecting and providing fingerprint information, or as an initial commissioning step that is performed before any sets of fingerprint information are provided.

According to example embodiments of the invention, thus a process of at least one of collecting and providing fingerprint information is controlled based at least on a result of a check for at least one error in at least one set of fingerprint information. Thus collection and/or provision of fingerprint information that is considered erroneous can be suppressed. Suppressing the collection of fingerprint information that is considered erroneous has the technical effect that less computational complexity has to be spent by an apparatus that collects the fingerprint information (e.g. an apparatus that is part of the device). Suppressing the provision of fingerprint information that is considered erroneous has the technical effect that the quality of the provided fingerprint information is enhanced. This has the technical effect that radiomaps that are generated and/or updated based on the provided fingerprint information are also enhanced in quality, thus allowing for more accurate position estimates that are based on the radiomaps. In particular in a scenario where the process for at least one of collecting and providing fingerprint information is controlled at the device (which is one device of a plurality of devices collecting and providing fingerprint information), a decentralized quality-improving filtering of fingerprint information is achieved, which, compared to a centralized filtering where the provided fingerprint information of a plurality of devices is only filtered at an apparatus that performs the generation and/or updating of the radiomaps, distributes the computational complexity involved with the filtering onto the plurality of devices that each then have to bear much less computational complexity, and furthermore vastly reduces the transmission bandwidth required for provision of fingerprint information, since the fingerprint information that is considered to be erroneous is not provided by the devices at all. Furthermore, the apparatus that performs the generation and/or updating of the radiomaps may not even have the possibility to check the validity of the sets of fingerprint information in the way proposed by example embodiments of the invention, when it receives sets of fingerprint information from the devices. For instance, in the devices, it is possible to analyze the exact sets of fingerprint information from a given device over a longer period of time.

In example embodiments of the invention, the at least one check requires information from several sets of fingerprint information including the at least one set of fingerprint information.

The at least one check may for instance be based on checking if identification information (or parts thereof) for at least one of a radio node or cell consistently remains the same over several sets of fingerprint information or not, if it changes correctly in handover scenarios or if it remains constant over several sets of fingerprint information although position information representative of the at least one position of the device and contained in these sets of fingerprint information indicates that, in view of the distance covered, it should have changed, to name but a few examples.

In example embodiments of the invention, the at least one error is an error of at least a part of the identification information contained in the at least one set of fingerprint information and/or of at least a part of identification information contained in the set of fingerprint information for identifying an area that comprises the at least one of a radio node and a cell, but not an error of position information representative of the at least one position of the device and contained in the at least one set of fingerprint information.

In example embodiments of the invention, the controlling of the process for at least one of collecting and providing fingerprint information comprises at least one of stopping, suspending, not starting, starting and resuming at least one of collecting and providing at least a part of the fingerprint information.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Experience has shown that the fingerprint information provided by devices in cellular and/or non-cellular communication systems may be flawed in many ways. Some device chipsets may have issues with measurements of data from neighbor cells, and some other device chipsets may have issues in reporting the local (e.g. physical) cell identifier of the serving cell. Nevertheless, there generally exists only a limited set of issues and those can be detected by analysis of the fingerprint information.

In example embodiments of the invention, the idea is that the fingerprint collection/provision software in a device has a library that describes the tests to detect these known flaws. For instance, when the device with the fingerprint collection/provision software is first taken into use, the collection/provision software first collects a plurality of sets of fingerprint information, after which the sets are tested against the known flaws. Some of the flaws may be such that the fingerprint information collection and/or provision from the device gets terminated completely. On the other hand, some other flaws may be such that some subset of the fingerprint information gets blacklisted from collection and/or provision (e.g. issues in the cell IDs of the neighbor cells may result in these cell IDs of the neighbor cells not being collected and/or provided).

An example embodiment of the invention may then take the following shape: A fingerprint collection software (or client or agent) collects and stores a plurality of sets of fingerprint information (e.g. network and GNSS measurements) over an extended period of time (e.g. several days, a week). These cached sets of fingerprint information are analyzed in the client with respect to a library of stored patterns, wherein the library comprises tests for a large variety of known issues in the network measurements. In case the tests pass, enabling the fingerprint collection and/or provision to the learning servers (e.g. radiomap generating and/or updating server). The result of the analysis may also be that only a subset of the data that could be collected is provided to the learning servers.

The testing of the sets of fingerprint information may for instance continue in the background even though the device is already sending fingerprint information to the servers. The quality control can thus be a continuous background process in the fingerprint collection/provision software.

Figure 1:
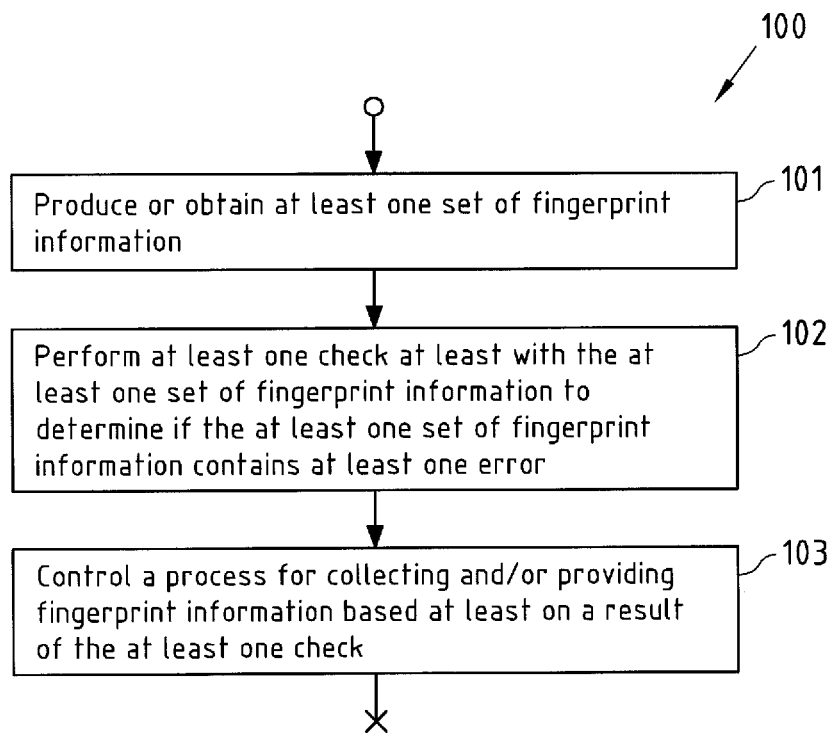
FIG. 1 is a flow chart illustrating an example embodiment of a method according to a first aspect of the invention.

FIG. 1 is a flowchart 100 of an example embodiment of a method according to a first aspect of the invention. In a step 101, at least one set of fingerprint information is produced or obtained. The at least one set of fingerprint information comprises identification information for identifying at least one of a radio node and a cell observed at at least one position of the device. The fingerprint information may also comprise further information, such as for instance position information representative of the at least one position of the device. In a step 102, at least one check is performed at least with the at least one set of fingerprint information to determine if the at least one set of fingerprint contains at least one error. In a step 103, a process for collecting and/or providing fingerprint information is controlled based at least on a result of the at least one check.

The method of flowchart 100 is performed by an apparatus. Such an apparatus represents an example embodiment of an apparatus according to the first aspect of the invention. The apparatus may be associated with the device. The apparatus may for instance be a part of the device, or the apparatus and the device may be parts of the same unit. In example embodiments of the invention, the device is a mobile device, for instance a mobile device that is capable of determining which one or more radio nodes (e.g. of one or more cellular and/or non-cellular communication systems) and/or which one or more cells (e.g. of one or more cellular communication systems) are observable at its position, and is for instance further capable of determining its position (e.g. by means of a Global Navigation Satellite System (GNSS) receiver). Non-limiting examples of a mobile device are a mobile terminal, in particular a mobile phone, a personal digital assistant, a navigation device, a gaming device, a music and/or video player, a laptop computer or a tablet computer.

Figure 2:
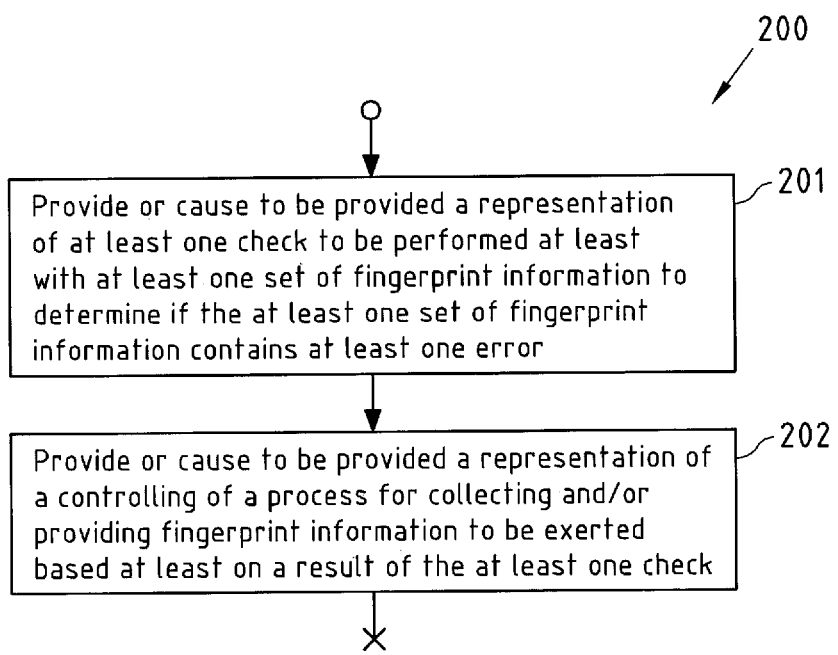
FIG. 2 is a flow chart illustrating an example embodiment of a method according to a first aspect of the invention.

FIG. 2 is a flowchart 200 of an example embodiment of a method according to a second aspect of the invention. In a first step 201, a representation of at least one check to be performed at least with at least one set of fingerprint information to determine if the at least one set of fingerprint information contains at least one error is provided or caused to be provided, e.g. to an apparatus that performs the method of FIG. 1, or to a device (e.g. the device to the position of which the fingerprint information pertains) that comprises such an apparatus. In a step 202, a representation of a controlling of a process for collecting and/or providing fingerprint information to be exerted based at least on a results of the at least one check is provided or caused to be provided, e.g. to the same entity to which the representation in step 201 is provided or caused to be provided, or to another entity. For instance, the representations of step 201 and step 202 may be provided or caused to be provided jointly. The representations of step 201 and step 202 may in particular form the basis for the at least one check performed according to step 102 of FIG. 1 and the control exerted according to step 103 of FIG. 1. The representations of step 201 and/or step 202 may for instance be embodied as computer program code, for instance as part of a software for collecting and/or providing fingerprint information, or as an add-on or update for such a software, or as a stand-alone software. The representations of step 201 may alternatively be embodied as rules, and the representations of step 202 may be embodied as control instructions. These rules and control instructions may for instance be interpretable by a software for collecting and/or providing fingerprint information in order to perform the at least one check and/or to exert the control on the process for collecting and/or providing fingerprint information. These rules and control instructions may for instance be formatted in the eXtensible Markup Language (XML).

The flowchart 200 of FIG. 2 is performed by an apparatus. This apparatus represents an example embodiment of an apparatus according to the second aspect of the invention. The apparatus may for instance be a provision apparatus. In example embodiments of the invention, the apparatus is a provision server, such as for instance a download server and/or an update server. The apparatus may be dedicated for the process of flowchart 200 only, or may comprise further functionality, such as for instance functionality to generate and/or update radiomaps based on received fingerprint information, and/or functionality to determine a position of a device based on measurement information received from a device and on radiomap information.

Figure 3:
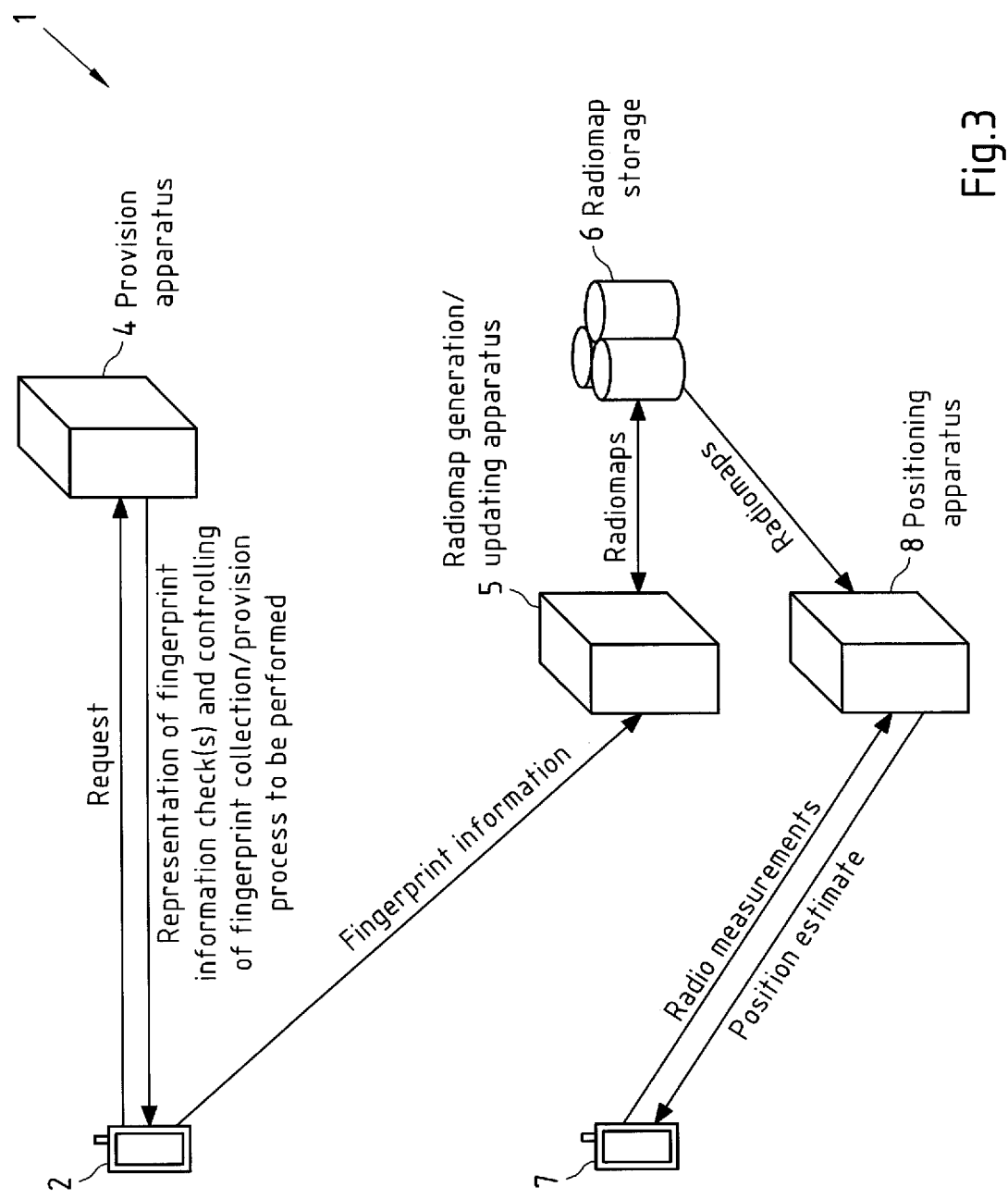
FIG. 3 is a schematic illustration of a system in which example embodiments of apparatuses according to the first and second aspect of the invention are deployed.
Figure 3:
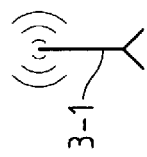
Figure 3:
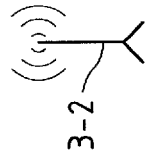
Figure 3:
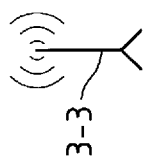

FIG. 3 schematically illustrates a system 1 in which the example embodiments of methods according to the first and second aspect of the invention may be deployed. Therein, device 2 and provision apparatus 4 may be considered as an example embodiment of a system according to the invention, with device 2 representing an example embodiment of an apparatus according to the first aspect of the invention and provision apparatus 4 representing an example embodiment of an apparatus according to the second aspect of the invention.

System 1 comprises a device 2, which may for instance be a mobile device such as for instance a mobile phone. Device 2 is at least capable of identifying one or more radio nodes (e.g. of one or more cellular and/or non-cellular communication systems) and/or one or more cells (e.g. of one or more cellular communication systems) at its position, and is for instance further capable of determining its position (e.g. by means of a Global Navigation Satellite System (GNSS) receiver). In FIG. 3, an exemplary number of three radio nodes 3-1, 3-2 and 3-3 are shown, which may for instance either be WLAN access points, or base stations of a cellular communication system, or a mixed ensemble thereof). Radio nodes 3-1, 3-2 and 3-3 are, for the exemplary case of a cellular communication system, also understood to represent respective cells of the cellular communication system. In system 1, device 2 serves as a data collector device that collects sets of fingerprint information and provides the sets of fingerprint information to radiomap generation/updating apparatus 5, which generates radiomaps from the sets of fingerprint information and causes the radiomaps to be stored in radiomap storage 6. Radiomaps from radiomap storage 6 may then for instance be used by positioning apparatus 8 to determine a position of device 7 and to provide information on this position to device 7. Device 7 is for instance not capable of determining its own position (e.g. due to lack of a GNSS receiver), but is capable of performing radio measurements that may for instance include at least information on the one or more radio nodes and/or cells that can be observed by device 7 at the position of device 7. Based on these radio measurements and on the radiomaps, positioning apparatus 8 is able to determine a position of device 7 and to provide information on this position to device 7 for use e.g. in a navigation application or other application requiring a current position of device 7. As an alternative to this device-assisted positioning mode, also a device-based positioning mode could be used, where a device has a local copy of at least a part of the radiomap and then is capable of determining its position itself. For simplicity of presentation, this latter mode is not illustrated in FIG. 3.

The information exchange between device 2 and provision apparatus 4 may for instance be based on at least partially wireless transmission. For instance, device 2 may use a cellular communication system to connect to a network, e.g. the Internet, to which in turn the provision apparatus 4 may be connected via a wirebound connection. The information exchange between device 2 and provision apparatus 4 may for instance be based on the Internet Protocol (IP) and/or the Transmission Control Protocol (TCP). The information exchange between device 7 and radiomap generation/updating server 5 may for instance take place as described for the information exchange between device 2 and the provision apparatus 4. Information exchanged between device 2 and provision apparatus 4 may then for instance be contained in the payload of TCP segments, or in the payload of higher-protocol-layer protocol data units (that in turn are comprise in the payload of TCP segments)).

It is to be noted that each of the provision apparatus 4, the radiomap generation/updating apparatus 5 and the positioning apparatus 8 may be embodied as a computer, in particular as a server. Provision apparatus 4 and radiomap generation/updating apparatus 5 may for instance be functional parts of the same unit, such as for instance a server. Also the functionality of positioning apparatus 8 may be included into such a joint unit.

In the system 1 of FIG. 3, non-limiting examples of radio nodes 3-1, 3-2 and 3-3 are base stations (or sectors thereof) of a cellular communication system, such as for instance a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, or CDMA-2000) or fourth generation (4G, for instance the Long Term Evolution, LTE, system, the LTE Advanced (LTE-A) system or the IEEE 802.16m WiMAX system) communication system, or access points or beacons of a non-cellular radio communication system, such as for instance a WLAN system, a Bluetooth system, a radio-frequency identification (RFID) system, a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc. The communication networks can support speech and data, or speech only, or data only. For instance, data coverage provided by a wireless hotspot using a cellular connection, such as for instance an ad-hoc WLAN hotspot formed by tethering with a cellular phone, or a MiFi hotspot, is considered as a cell, in particular a "data cell", of a communication network.

As already stated, radio nodes 3-1, 3-2 and 3-3 may, in case of a cellular communication system, be considered to represent respective cells of the cellular communication systems. A cellular communication system may for instance be characterized by a basically seamless pavement of a geographical area (usually in the order of at least hundreds or thousands of square kilometers) with cells in which coverage is provided by respective radio nodes that are for instance operated by the same operator, which system may for instance support communication handover between cells. Consequently, a non-cellular communication system may be characterized as a communication system that does not have all of these properties. Radio nodes 3-1, 3-2 and 3-3 may be of the same communication system, but may equally well stem from different communication systems (e.g. different cellular communication systems, different non-cellular communication systems or from a mixture of cellular and non-cellular communication systems).

Each of radio nodes 3-1, 3-2 and 3-3 provides radio coverage in a respective coverage area. Accordingly, also the respective cells associated with radio nodes are associated with respective coverage areas. Coverage areas may be modelled by coverage area models. A radiomap may then for instance comprise information representative of the respective coverage area models for a plurality of radio nodes, e.g. for a specific area. Additionally or alternatively, a radiomap may comprise information such as radio node positions, radio channel models, Rx fields, etc. A radio channel model may for instance describe how the power of a signal emitted by a radio node decays with increasing distance from the radio node, for instance under consideration of further parameters as for instance the radio transmission frequency. To this end, the radio channel model may for instance take into account effects of free space propagation, slow fading and fast fading, to name but a few examples. A coverage area generally depends on a plurality of parameters of both the radio node that provides the coverage area (inter alia antenna beamwidth and positioning, transmission power) and the propagation environment (inter alia pathloss and shadowing caused by obstructing elements). A coverage area model may for instance be or at least be desired to be representative of a coverage area. However, at least temporary deviations may occur between the model and the actual coverage area, for instance in case of changes or movement of the coverage area. A model for a coverage area may for instance be a model representing hard boundaries of a coverage area, or a model that represents a coverage area in a statistical sense, for instance by means of a probability (density) function. An example of such a statistical representation of a coverage model is a multi-normal distribution. A coverage area model may only be a coarse model of a coverage area, e.g. an elliptical or polygonal model. The coverage area model may equally well be constituted by a set of grids of a grid of regions, e.g. a rectangular grid of regions. In a simple exemplary case, a coverage area model may be represented by a position of the radio node providing the coverage area and information on the reach of this radio node. In a cellular system, a coverage area of a radio node may for instance at least roughly correspond to a cell associated with the radio node.

Now, if a device like device 7 determines that it can presently observe radio nodes 3-1, 3-2 and 3-3, or can presently observe cells that are respectively associated with these radio nodes 3-1, 3-2 and 3-3 in case of cellular communication systems, this means that device 7 is located in the intersection of the respective coverage areas of these radio nodes or cells. A position of device 7 may then be determined by positioning apparatus 8 based on the coverage area models for these three radio nodes or cells, which coverage area models are contained in the radiomap available to positioning apparatus 8 due to his interface to radiomap data storage 6 and can be identified based on the radio node or cell identification information contained in the radio measurements provided by device 7 to positioning apparatus 8. Instead of (or in addition to) the coverage area models, also the mere position of the three observed radio nodes 3-1, 3-2 and 3-3 may be used by positioning apparatus 8 to determine a position for device 7, perhaps by additionally taking into account Received Signal Strength (RSS) and/or pathloss measurements performed by device 7 and included in the radio measurements provided to positioning apparatus 8, which RSS/pathloss measurements give an indication of a distance of device 7 towards the respective radio nodes 3-1, 3-2 and 3-3.

A radio node or a cell associated with a radio node may for instance be observable by a device if the device is able to receive one or more signals (e.g. a broadcast channel) sent by the radio node with a pre-defined minimum quality (for instance defined in terms of a signal-to-noise ratio or a signal-to-noise and interference ratio), and/or is able to at least partially receive and correctly decode one or more signals sent by the radio node, and/or is able to receive and correctly decode an identifier of the radio node (or an identifier of the cell that is associated with the radio node). Some or all of these conditions for observing a radio node (or a cell associated with the radio node) may for instance be met when the device is within the coverage area of the radio node or cell.

Therein, a radio node or cell of a communication system may for instance have a system-wide identifier, e.g. an identifier that identifies the radio node or cell uniquely at least within the communication system. Such a system-wide identifier may thus for instance be understood to be "globally" unique at least in the communication system. It may furthermore be unique also with respect to further (or all) communication systems that deploy radio nodes and/or cells.

Alternatively, a radio node or cell of a communication system may for instance have a local identifier, e.g. an identifier that is not a system-wide identifier. This local identifier may for instance only be "locally" unique in the communication system. It may nevertheless at least be unique in a subregion of a region covered by the communication system. Such local identifiers are for instance based on a set of one or more (e.g. physical) resources assigned for use by a radio node or cell by a network operator. Non-limiting examples of such resources are frequency channels, timeslots, spreading codes, scrambling codes, spatial channels (e.g. antenna beams, space-time codes or eigenmodes) and polarization channels.

An example of a system-wide identifier for a cell of a cellular communication system is the Global Cell Identifier (GCI), which is based on the Country Code-Network Code-Cell ID hierarchy in 3GPP networks (SID-NID-BSID in CDMA/CDMA2000 networks). A cell may be uniquely identified on a global basis with its GCI. Identifying a cell (e.g. a serving cell) in a globally unique sense may, in addition to the above-described requirements for observing a cell, further require that a system information element containing information on the GCI for these cells is decoded.

An example of a local identifier for a cell of a cellular communication system is the Local Cell Identifier (LCI), which is related to the physical resources allocated for the cell. For example, in the case of GSM and its derivatives the physical resources are associated with the cell tower (BISC) and the frequency (ARFCN). The physical resources are re-used in the network, i.e. the same BSIC/ARFCN combination repeats in the network. Thus the LCI can be identified with the corresponding GCI only, when there is additional information on the location, i.e. the mapping LCI→GCI is only locally injective whereas GCI→LCI mapping is globally injective.

The following table summarizes the GCIs and LCIs across the commonly used communication networks with different air interface types.

| Network | Global Cell ID | Local Cell ID |
|---|---|---|
| GSM | PLMN + 16-bit LAC + 16-bit Cell ID | BSIC (range 0-63) + ARFCN (range 0-1023) |
| WCDMA | PLMN + 28-bit UCID | UARFCN-DL (range 0-16383) + P-CPICH range (0-511) |
| TD-SCDMA | PLMN + 28-bit UCID | UARFCN-Nt (range 0-16383) + Cell Parameters ID (range 0-127) |
| LTE | PLMN + 28-bit Cell ID | EARFCN (range 0-65535) + Physical Cell Identifier (range 0-503) |
| CDMA | System ID (15 bits) + Network ID (16 bit) + BS-ID (16 bits) | PN offset (range 0-511) + Band class (range 0-31) + CDMA frequency (range 0-2047) |

Therein, the following abbreviations have been used in the above table:
WCDMA=Wide-Band CDMA
CDMA=Code Division Multiple Access
TD-SCDMA=Time Division Synchronous CDMA
LTE=Long Term Evolution
PLMN=Public Land Mobile Network (MCC+MNC)
MCC=Mobile Country Code
MNC=Mobile Network Code
BSIC=Base Station Identity Code
ARFCN=Absolute Radio Frequency Channel
UARFCN=UTRAN ARFCN
UTRAN=UMTS Terrestrial RAN
RAN=Radio Access Network
P-CPICH=Primary Control Pilot Channel
EARFCN=Evolved ARFCN
UCID=UTRA Cell ID An example for a system-wide identifier of a radio node of a non-cellular communication system is a BSSID (like a Medium Access Control (MAC) identifier) of a WLAN access point).

A prerequisite for the generation of the radiomaps in radiomap storage 6 is the collection and provision of sets of fingerprint information by data collector devices, such as for instance device 2, to radiomap generation/updating apparatus 5. A set of fingerprint information comprises identification information for identifying at least one of a radio node and a cell observed at at least one position of device 2. The fingerprint information may further comprise respective position information representative of the at least one position of device 2. The position information may for instance be produced (e.g. measured or estimated) by a GNSS receiver of device 2 (e.g. a Global Positioning System (GPS) receiver, an Assisted GPS (A-GPS) receiver, a Galileo receiver, a GLObal NAvigation Satellite System (GLONASS) receiver, or a Beidou receiver, to name but a few examples), but may alternatively be taken from a map or determined by another positioning technique. If the set of fingerprint information contains position information for several positions, the respective position information for the positions may for instance have been determined (e.g. measured) at different time instants, so that, e.g. due to mobility of device 2, the positions are all different. For each position, it is determined which radio nodes and/or cells are observable at this position. This may for instance be accomplished by checking which radio nodes and/or cells are observable by the device at a time instant and also determining the position information substantially at this time instant. To ensure that the radio nodes and/or cells determined to be observable and the position information are sufficiently associated, i.e. pertain to the same position of device 2, it may be necessary to produce the position information and to determine which radio nodes and/or cells are observable within a time window of limited length, e.g. of a length of 10 s, 5 s, 1 s, 500 ms, 100 ms or 10 ms, to name but a few values. The higher the velocity of device 2, the smaller the length of the time window should be. The identification information on the at least one radio node and/or cell comprised in the fingerprint information may be in the form of identifiers, e.g. system-wide and/or local identifiers, e.g. GCIs and LCIs in case of cells, or e.g. BSSIDs in case of (non-cellular) radio nodes, as already discussed above. The set of fingerprint information may equally well comprise RSS and/or pathloss and/or timing (e.g. Timing Advance or Round-Trip-Time) measurements performed by device 2, as already discussed above. Such information may equally well be introduced into radiomaps and then exploited for positioning devices like device 7.

Alternatively, the position of device 2 may be determined by a unit that is different from device 2, such as for instance positioning apparatus 8, e.g. based on radiomap-based positioning, and information on the position of device 2 may then be associated with (e.g. included into) fingerprint information provided by device 2. For instance, device 2 may collect information for a radiomap for radio nodes or cells of one or more cellular communication systems, and the lacking positions of device 2 may be determined (e.g. by positioning apparatus 8 or another apparatus that is different from device 2) based on an existing radiomap for radio nodes of one or more non-cellular communication systems (e.g. a WLAN system). Device 2 may then provide fingerprint information with information on radio nodes and/or cells of both the one or more cellular communication systems (to be used for the generation and/or updating of the radiomap) and the one or more non-cellular communication systems (to allow its position to be determined).

The identification information comprised in a set of fingerprint information may pertain to serving cells and/or neighbor cells. A serving cell is understood as the cell with which the device 2 (e.g. a mobile terminal) is currently associated when communicating in a cellular communication system, and/or with which it would be associated when starting to communicate in the cellular communication system. A serving cell may for instance be the cell (e.g. of one or more cellular communication systems in which device 2 is capable and/or entitled to communicate) associated with the radio node from which device 2 receives signals with the highest signal strength as compared to the signals received from radio nodes associated with other cells of the one or more cellular communication systems. In case of a device 2 with two Subscriber Identity Module (SIM) cards, device 2 may even be associated with two different serving cells at the same time. A neighbor cell is understood as a cell that is not a serving cell, but which is nevertheless observable by the device. Therein, neighbor cells may be of the same communication system as the serving cell, or may at least partially be of one or more other communication systems. Both serving cells and neighboring cells may for instance be identifiable based on respective system-wide identifiers and local identifiers. It may however depend on the capabilities of the device which type of identification information (system-wide and/or local identifiers) can be generated for observed serving cells and observed neighbor cells.

The quality of sets of fingerprint information may significantly depend on the device 2 that produces the sets of fingerprint information. For instance, devices may have issues with correctly handling identifiers of radio nodes/cells, which issues may be mainly or entirely attributable to software flaws, as will be further discussed below. In example embodiments of the present invention, it is therefore inter alia proposed to check one or more sets of fingerprint information produced at device 2 for errors, and to control the collection and/or provision of fingerprint information accordingly. Computer program code for conducting this checking and controlling is stored and executed on device 2. This computer program code may for instance be pre-installed on device 2, but may equally well be installed later on, either together with a software for collecting and/or providing fingerprint information, or separate therefrom. The computer program code may for instance be downloaded by device 2 from provision apparatus 4 (e.g. from an app store operated by provision apparatus 4), for instance upon request from device 2. Alternatively, the computer program code may be pushed by provision apparatus 4 to device 2, for instance on a regular basis and/or in response to pre-defined events. Such a pre-defined event may for instance be the discovery or availability of new checks and/or controls. The computer program code thus constitutes an example of representations of fingerprint information checks(s) and of a controlling of a fingerprint collection/provision process to be performed, which representation if provided by provision apparatus 4 to device 2.

Figure 4A:
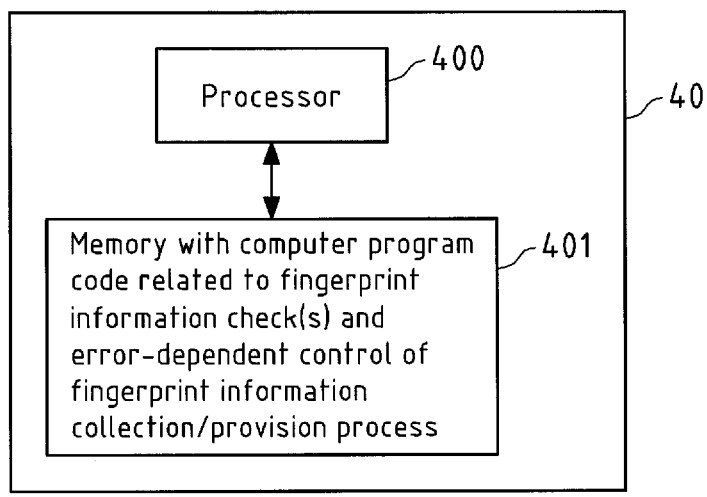
FIG. 4a is a schematic block diagram of an example embodiment of an apparatus according to the first aspect of the invention.

FIG. 4a is a schematic block diagram of an example embodiment of an apparatus 40 according to the first aspect of the invention. Apparatus 40 of FIG. 4a may for instance represent at least a part (e.g. a functional unit or module) of device 2 of FIG. 3.

Apparatus 40 comprises at least one processor 400 and at least one memory 401 including computer program code, the at least one memory 401 and the computer program code configured to, with the at least one processor 400, cause an apparatus (for instance apparatus 40, or another apparatus that comprises apparatus 40, e.g. apparatus 41 of FIG. 4b) at least to perform the method of FIG. 1 (and for instance also one or more of its further features that will be discussed below). Processor 400 for instance executes the computer program code stored in memory 401. Processor 400 for instance accesses memory 401 via a bus.

The memory 401 comprises a computer program code related to fingerprint information check(s) and error-dependent control of a fingerprint information collection/provision process. The computer program code thus represents an example embodiment of a computer program according to the first aspect of the invention, i.e. a computer program that when executed by processor 400 causes apparatus 40 (or an apparatus that comprises apparatus 40, e.g. apparatus 41 of FIG. 4b) to perform the actions of the method of FIG. 1.

Apparatus 40 is also an example embodiment of an apparatus that is configured to perform or comprises respective means for performing the method of FIG. 1 (and for instance also one or more of its further features that will be discussed below). The processor 400 of apparatus 40 may for instance represent means for performing the method of FIG. 1. Apparatus 40 may thus for instance comprise means for producing or obtaining at least one set of fingerprint information, means for performing at least one check at least with the at least one set of fingerprint information to determine if the at last one set of fingerprint information contains at least one error, and means for controlling a process for collecting and/or providing fingerprint information based at least on a result of the at least one check. These means may be represented by different functional modules or different circuitry of processor 400, or may at least partially or entirely be represented by the same functional modules or the same circuitry.

In apparatus 40, a process of collecting and/or providing fingerprint information may for instance also be operated by processor 400, for instance based on computer program code also stored in memory 401. To conduct this process, apparatus 40 may then for instance use further components as will be discussed with respect to FIG. 4b below. Nevertheless, the process of collecting and/or providing fingerprint information may equally well be implemented by another apparatus. Sets of fingerprint information produced by this other apparatus are then obtained by apparatus 40 (e.g. via an interface), and the process of collecting and/or providing fingerprint information may then be controlled by apparatus 40 by exchanging control signals between apparatus 40 and the other apparatus (e.g. via an interface).

Figure 4B:
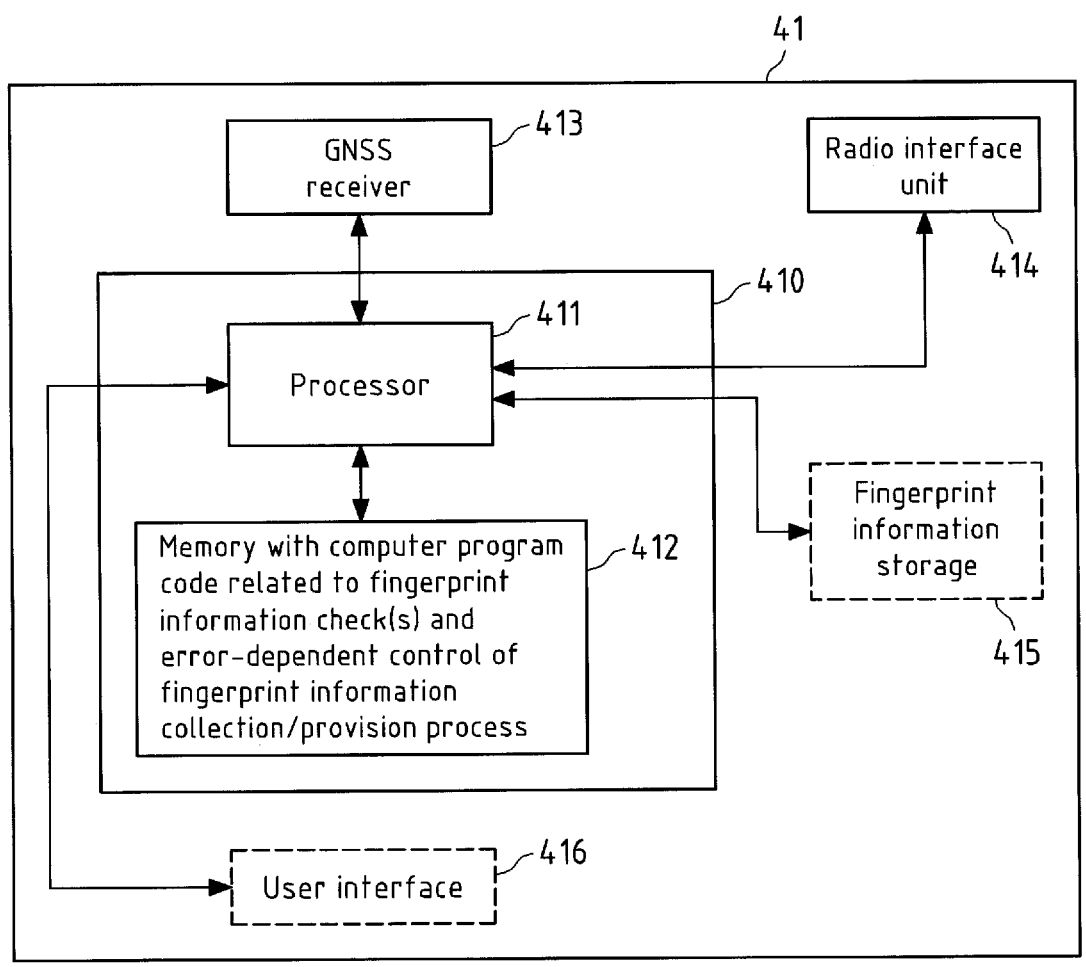
FIG. 4b is a schematic block diagram of an apparatus that comprises example embodiments of apparatuses according to the first aspect of the invention.

FIG. 4b is a schematic block diagram of an apparatus 41 that is either an example embodiment of an apparatus 41 according to the first aspect of the invention or an apparatus 41 that comprises an example embodiment of an apparatus 410 according to the first aspect of the invention. Apparatus 41 may for instance represent device 2 of FIG. 3, or a part thereof.

Apparatus 41 comprises a unit 410 (an apparatus for instance embodied as an integrated circuit), that comprises a processor 411 and a memory 412 with computer program code related to fingerprint information check(s) and error-dependent control of a fingerprint information collection/provision process. Apparatus 41 further comprises a GNSS receiver 413 that is configured to provide position information (e.g. a measurement or estimate) on the current position of GNSS receiver 413 and thus also of apparatus 41. GNSS receiver 413 is for instance configured to provide the position information to processor 411, so that processor 411 is able to include the position information into a set of fingerprint information. GNSS receiver 413 may equally well be replaced by another unit for determining a position of apparatus 41, or may be dispensed with at all, if the fingerprint information does not require position information on the position(s) of apparatus 41 or a device that comprises apparatus 41. Apparatus 41 further comprises a radio interface unit 414 providing respective interfaces to one or more cellular and/or non-cellular communication systems. Radio interface unit 414 enables apparatus 41 at least to observe radio nodes and/or cells associated with radio nodes of those communication systems to which radio interface unit 414 is compatible (of course only when apparatus 41 is in the coverage area of these radio nodes). Radio interface unit 414 may further enable apparatus 41 to communicate with radio nodes (or in cells) of those communication systems to which radio interface unit 414 is compatible. Examples of communication systems have already been presented above. In particular, radio interface unit 414 may enable apparatus 41 to receive a representation of at least one check to be performed with at least one set of fingerprint information and a representation of an according controlling to be exerted on a process for collecting and/or providing fingerprint information (in particular from provision apparatus 4), and/or to transmit a request for such representations (in particular to provision apparatus 4), and/or to provide fingerprint information (in particular to radiomap generation/updating apparatus 5). Radio interface unit 414 may for instance be representative of the RF frontend components, the Analog Baseband (ABB) components, the Digital Baseband (DBB) components and the baseband processor. Apparatus 41 may further comprise an optional fingerprint information storage 415, in which for instance sets of fingerprint information to be checked may be stored. Alternatively, this memory 415 may be a part of memory 412. Furthermore, apparatus 41 may comprise an optional user interface 416 that is controlled by processor 411 and may for instance comprise a display, a keyboard, a keypad or a touchscreen, to name but a few examples. The display or the touchscreen may for instance be used to display results of checks performed to sets of fingerprint information, for instance if certain errors have been detected, and/or to display information on control operations that are performed on a process for collecting and/or providing fingerprint information.

Unit 410 of apparatus 41 may for instance be the apparatus 40 of FIG. 4a and thus may constitute, within apparatus 41, an example embodiment of an apparatus according to the first aspect of the invention. Thus the description of apparatus 40 of FIG. 4a equally applies here, with processor 411 corresponding to processor 400 and memory 412 corresponding to memory 401.

As already stated, also apparatus 41 of FIG. 4b in its entirety constitutes an example embodiment of an apparatus according to the first aspect of the invention, in particular an apparatus that also operates a process of collecting and/or providing fingerprint information.

Apparatus 41 comprises at least one processor 411 and at least one memory 412 including computer program code, the at least one memory 412 and the computer program code configured to, with the at least one processor 411, cause apparatus 41 at least to perform the method of FIG. 1 (and for instance also one or more of its further features that will be discussed below). Apparatus 41 is then in particular caused to perform the actions of producing at least one set of fingerprint information (e.g. as a part of a process of collecting and/or providing fingerprint information, e.g. with GNSS receiver, radio interface unit 414 and processor 411), performing at least one check at least with the at least one set of fingerprint information to determine if the at last one set of fingerprint information contains at least one error (e.g. with processor 411), and controlling a process for collecting and/or providing fingerprint information based at least on a result of the at least one check (e.g. with processor 411). The at least one memory 412 and the computer program code may then for instance further be configured to, with the at least one processor 411, cause apparatus 41 at least to perform providing fingerprint information (e.g. as part of the process for collecting and/or providing fingerprint information, e.g. via radio interface unit 414).

Apparatus 41 then is also an example embodiment of an apparatus that is configured to perform or comprises respective means for performing the method of FIG. 1 (and for instance also one or more of its further features that will be discussed below). The processor 411 of apparatus 41 may for instance represent means for performing the method of FIG. 1. Apparatus 41 may thus for instance comprise means (e.g. GNSS receiver, radio interface unit 414 and processor 411) for obtaining and/or producing at least one set of fingerprint information (e.g. as part of a process for collecting and/or providing fingerprint information), means (e.g. processor 411) for performing at least one check at least with the at least one set of fingerprint information to determine if the at last one set of fingerprint information contains at least one error, and means (e.g. processor 411) for controlling a process for collecting and/or providing fingerprint information based at least on a result of the at least one check. Apparatus 41 may then for instance also comprise means (e.g. radio interface unit 414) for providing fingerprint information (e.g. as part of the process for collecting and/or providing fingerprint information).

In the process of collecting and/or providing fingerprint information, apparatus 41 may for instance collect (e.g. produce) fingerprint information (e.g. in regular intervals, e.g. each minute) and provide this fingerprint information (e.g. as one or more sets of fingerprint information) to an external entity (e.g. to radiomap generation/updating apparatus 5 of FIG. 3; e.g. in regular intervals or whenever a pre-defined number of sets of fingerprint information has been collected). As already stated, the computer program code that implements the method of FIG. 1 and imposes a control on this process of collecting and/or providing fingerprint information may be an integral part or an add-on or update to a computer program code implementing the process of collecting and/or providing fingerprint information.

Figure 5A:
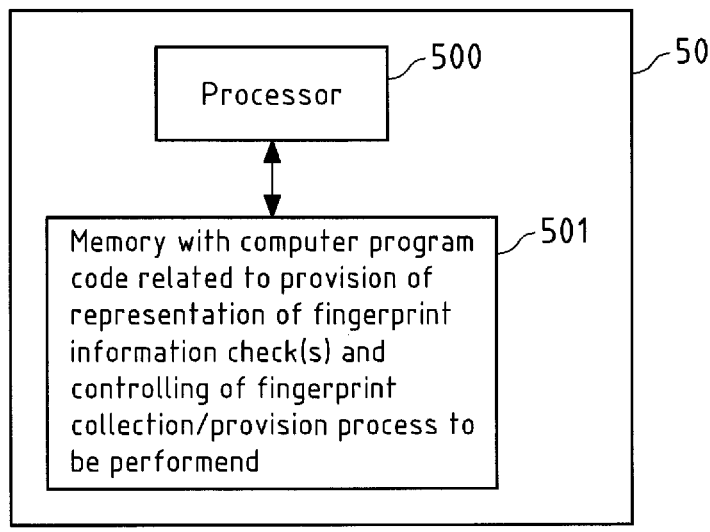
FIG. 5a is a schematic block diagram of an example embodiment of an apparatus according to the second aspect of the invention.

FIG. 5a is a schematic block diagram of an example embodiment of an apparatus 50 according to the second aspect of the invention. Apparatus 50 of FIG. 5a may for instance represent at least a part (e.g. a functional unit or module) of provision apparatus 4 of FIG. 3.

Apparatus 50 comprises at least one processor 500 and at least one memory 501 including computer program code, the at least one memory 501 and the computer program code configured to, with the at least one processor 500, cause an apparatus (for instance apparatus 50, or another apparatus that comprises apparatus 50, e.g. apparatus 51 of FIG. 5b) at least to perform the method of FIG. 2 (and for instance also one or more of its further features that will be discussed below). Processor 500 for instance executes the computer program code stored in memory 501. Processor 500 for instance accesses memory 501 via a bus.

The memory 501 comprises a computer program code related to a provision of representations of fingerprint information check(s) and a controlling of a fingerprint collection and/or provision process to be performed. The computer program code thus represents an example embodiment of a computer program according to the second aspect of the invention, i.e. a computer program that when executed by processor 500 causes apparatus 50 (or an apparatus that comprises apparatus 50, e.g. apparatus 51 of FIG. 5b) to perform the actions of the method of FIG. 2.

Apparatus 50 is also an example embodiment of an apparatus that is configured to perform or comprises respective means for performing the method of FIG. 2 (and for instance also one or more of its further features that will be discussed below). The processor 500 of apparatus 50 may for instance represent means for performing the method of FIG. 2. Apparatus 50 may thus for instance comprise means (e.g. processor 500) for providing or causing to be provided a representation of at least one check to be performed at least with at least one set of fingerprint information to determine if the at least one set of fingerprint information contains at least one error, and means (e.g. processor 500) for providing or causing to be provided a representation of a controlling of a process for at least one of collecting and providing fingerprint information to be exerted based at least on a result of the at least one check. These means may be represented by different functional modules or different circuitry of processor 500, or may at least partially or entirely be represented by the same functional modules or the same circuitry.

Apparatus 50 may for instance only cause provision of the representations of the check(s) to be performed and of the controlling to be performed. This may for instance accomplished by issuing, by apparatus 50, according control signals to one or more other apparatuses that perform the task of providing the representation. An example of such another apparatus is an app store server, to which the representations are for instance uploaded by apparatus 50, so that the representations are provided for retrieval by devices at the app store server. Another example of such another apparatus is a communication apparatus that is capable of transmitting the representations to devices. Equally well, apparatus 50 may perform the provision of the representations itself, based on further components forming part of apparatus 50 but not shown in FIG. 5a. Such a scenario is discussed with respect to FIG. 5b below.

Figure 5B:
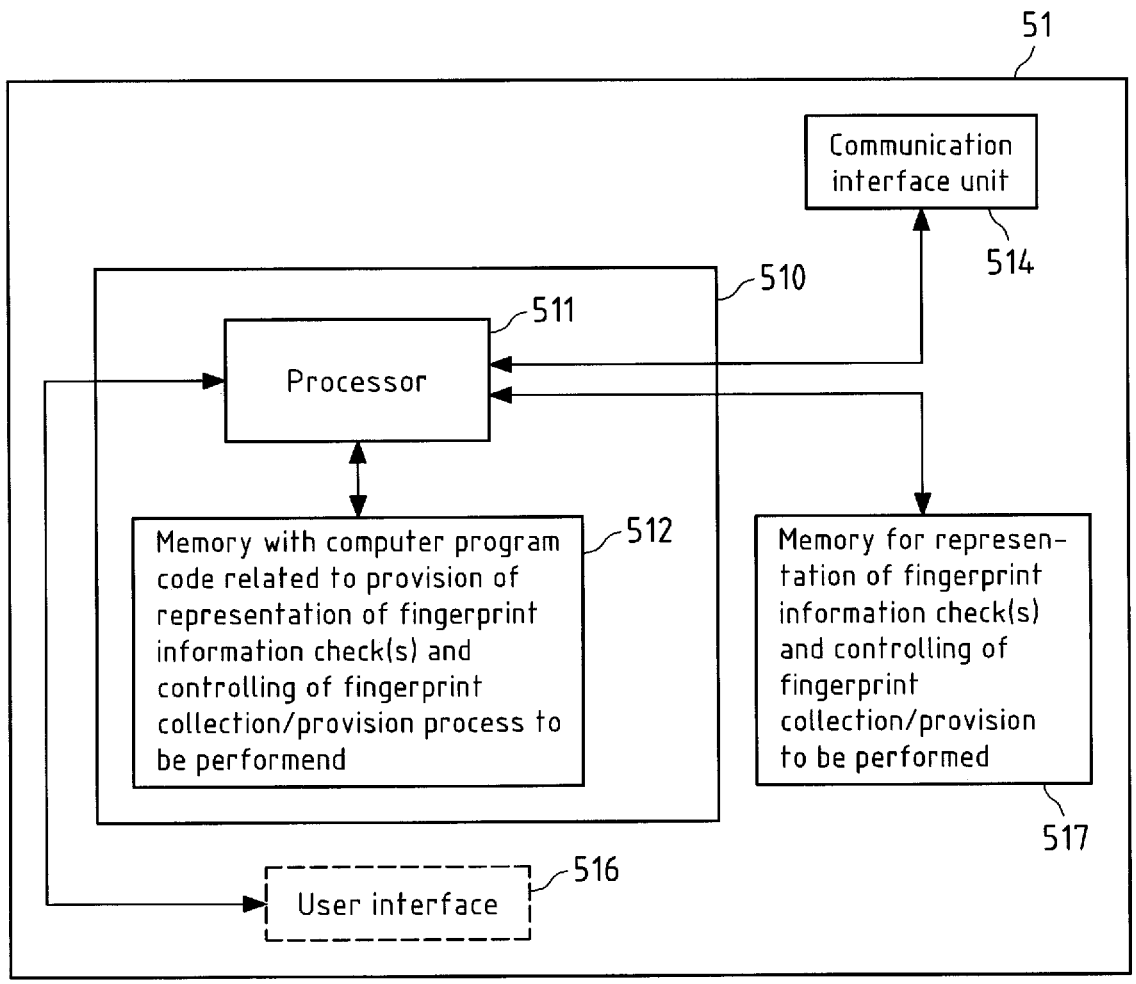
FIG. 5b is a schematic block diagram of an apparatus that comprises example embodiments of apparatuses according to the second aspect of the invention.

FIG. 5b is a schematic block diagram of an apparatus 51 that is either an example embodiment of an apparatus 51 according to the second aspect of the invention or an apparatus 51 that comprises an example embodiment of an apparatus 510 according to the second aspect of the invention. Apparatus 51 may for instance represent query-processing apparatus 4 of FIG. 3, or a part thereof.

Apparatus 51 comprises a unit 510 (for instance embodied as an integrated circuit), that comprises a processor 511 and a memory 512 with computer program code related to a device suitability check.

Apparatus 51 further comprises a communication interface unit 514 providing an interface to one or more communication networks. One or more of these communication networks may be wireless or wirebound. Communication interface unit 514 may for instance allow apparatus 51 to connect to a network, such as for instance the Internet, or to a cellular or non-cellular wireless communication network. If device 2 of FIG. 3 is then also capable of accessing the Internet or using the wireless communication network, device 2 and apparatus 51 can exchange information, such as representations of one or more checks and respective controlling to be performed on a device and requests for such representations. Furthermore, apparatus 51 may comprise an optional user interface 516 that is controlled by processor 511 and may for instance comprise a display and/or a keyboard, to name but a few examples. The display may for instance be used to display a status of the provision of the representations to a device. Apparatus 51 further comprises a memory 517 for storing representations of one or more checks and respective controlling to be performed on a device, to be able to provide or cause provision of such representations. As already stated, these representations may be embodied in computer program code that is for instance an integral part of a software for collecting and/or providing fingerprint information or an add-on or update therefor. There may for instance be only one set of representations (e.g. one computer program code) that is provided or caused to be provided to all devices, and then contains checks for all errors that are known for these devices. Alternatively, there may exist different sets of representations for different classes of devices (e.g. for devices of different manufacturers, or for devices with different operating systems, to name but a few examples for different classes of devices), wherein each set of representations may for instance only comprise checks (and according controlling instructions) that pertain to the devices of the respective class of devices. It may also be imaginable that there exist sets of representations for each type of device. The information contained in memory 517 is accessible to processor 511. Memory 517 may for instance be a non-volatile memory. It may for instance be a hard disc drive, a Storage Area Network (SAN) or a Direct Attached Storage (DAS), to name but a few examples.

Unit 510 of apparatus 51 may for instance be the apparatus 50 of FIG. 5a and thus may constitute, within apparatus 51, an example embodiment of an apparatus according to the first aspect of the invention. Thus the description of apparatus 50 of FIG. 5a equally applies here, with processor 511 corresponding to processor 500 and memory 512 corresponding to memory 501.

As already stated, also apparatus 51 of FIG. 5b in its entirety constitutes an example embodiment of an apparatus according to the second aspect of the invention. Apparatus 51 may then for instance perform the providing of the representations of the at least one check and the controlling to be performed itself.

Apparatus 51 then comprises at least one processor 511 and at least one memory 512 including computer program code, the at least one memory 512 and the computer program code configured to, with the at least one processor 511, cause apparatus 51 at least to perform the method of FIG. 2 (and for instance also one or more of its further features that will be discussed below). Apparatus 51 is then in particular caused to perform the actions of providing a representation of at least one check to be performed at least with at least one set of fingerprint information to determine if the at least one set of fingerprint information contains at least one error, and of providing a representation of a controlling of a process for at least one of collecting and providing fingerprint information to be exerted based at least on a result of the at least one check.

Apparatus 51 then is also an example embodiment of an apparatus that is configured to perform or comprises respective means for performing the method of FIG. 2 (and for instance also one or more of its further features that will be discussed below). The processor 511 of apparatus 51 may for instance represent means for performing the method of FIG. 2. Apparatus 51 may thus for instance comprise means (e.g. communication interface unit 514) for providing a representation of at least one check to be performed at least with at least one set of fingerprint information to determine if the at least one set of fingerprint information contains at least one error, and means (e.g. communication interface unit 514) for providing a representation of a controlling of a process for at least one of collecting and providing fingerprint information to be exerted based at least on a result of the at least one check. The means may for providing the respective representations may for instance be the same means, but may equally well be different means.

With respect to the apparatuses of FIGS. 4a, 4b, 5a and 5b, some or all of their memories 401, 412, 501 and 512 may also be included into the respective processor 400, 411, 500 and 511. These memories may for instance be fixedly connected to their respective processor, or be at least partially removable from their respective processor, for instance in the form of a memory card or stick. The memories may for instance be non-volatile memories. They may for instance be a FLASH memory (or a part thereof), any of a ROM, PROM, EPROM and EEPROM memory (or a part thereof) or a hard disc (or a part thereof), to name but a few examples. The memories may also comprise an operating system for their respective processor. The memories may also comprise respective firmware for the respective apparatuses the memories are comprised in. The memories may for instance comprise a first memory portion that is fixedly installed in the respective apparatus, and a second memory portion that is removable from the respective apparatus, for instance in the form of a removable SD memory card. In the apparatuses of FIGS. 4a, 4b, 5a and 5b, further a main memory may be present, for instance in the form of a volatile memory. It may for instance be a Random Access Memory (RAM) or Dynamic RAM (DRAM), to give but a few non-limiting examples. It may for instance be used as a working memory for the respective processor when executing an operating system and/or computer programs.

The processors of the apparatuses of FIGS. 4a, 4b, 5a and 5b (and also any other processor mentioned in this specification) may be processors of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function. The processors of the apparatuses of FIGS. 4a, 4b, 5a and 5b may for instance be application processors that run an operating system.

Some or all of the components of the apparatuses of FIGS. 4a, 4b, 5a and 5b may for instance be connected via a bus. Some or all of the components of the apparatuses of FIGS. 4a, 4b, 5a and 5b may for instance be combined into one or more modules.

Figure 6:
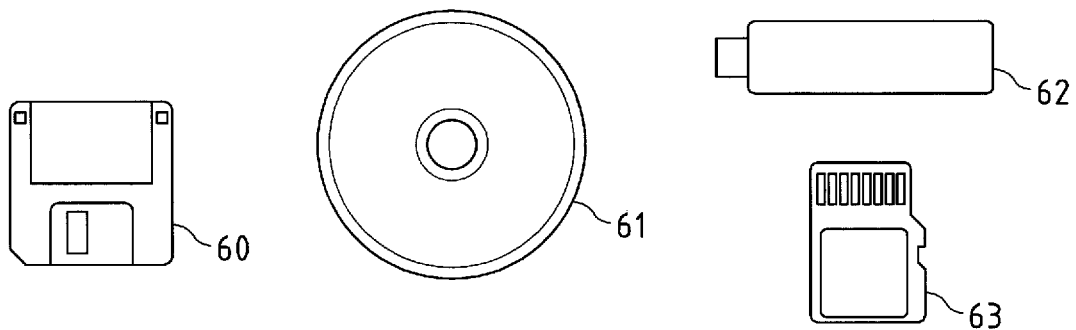
FIG. 6 is a schematic illustration of example embodiments of computer readable storage media according to the first and second aspect of the invention.

FIG. 6 illustrates example embodiments of computer-readable storage media 60-63 according to the first and second aspect of the invention. The computer readable storage media respectively store a computer program that, when executed by a processor, cause an apparatus to perform the method of FIG. 1 or FIG. 2 (and for instance also one or more of its further features that will be discussed below). The computer readable storage media are exemplarily removable and/or portable. As examples are depicted, a magnetic disc 60, an optical disc 61 (e.g. a Digital Versatile Disc (DVD)), a semiconductor memory stick 62 (e.g. a Universal Serial Bus (USB) stick) and a semiconductor memory card 63 (e.g. an SD-Card).

In the following, further details of the above-presented example embodiments of methods according to the first aspect (see FIG. 1) and the second aspect (see FIG. 2) of the invention, and also further example embodiments, will described. This description shall be understood to equally apply to the above-presented example embodiments of apparatuses, computer programs and computer readable media according to the first and second aspect of the invention and to the above-presented example embodiment of a system according to the invention.

As has become apparent, the method of FIG. 1 may for instance be performed by an apparatus (e.g. a processor) that may for instance be a part of a device to whose position the at least one set of fingerprint information pertains (and/or at which this position is determined), or may be integrated with this device in a further apparatus. The device may for instance be a mobile device, e.g. a mobile phone. The at least one set of fingerprint information may either be produced (in case the apparatus is capable of producing a set of fingerprint information, which may for instance require a radio interface unit and optionally a GNSS receiver or other positioning means) or obtained (e.g. from a component that is external to the apparatus). The at least one set of fingerprint information may for instance be produced (e.g. collected) within the to-be-controlled process of collecting and/or providing fingerprint information, or independent thereof, e.g. by a different process. It should be understood that the set of fingerprint information does not have to be produced or obtained as a formatted data structure comprising all components, but may equally well be produced or obtained as a logically associated bundle of components, which may for instance also be separate from each other. The at least one set of fingerprint information may for instance comprise position information. This may be position information for one position of a device only, or for a plurality of positions of the device. In case of several positions, the set of fingerprint information may accordingly comprise respective identification information for identifying the respective at least one radio node or cell observed at each of these positions (wherein the respective number of observed radio nodes or cells at one or more of the positions may be different). The at least one set of fingerprint information may comprise identification information (e.g. respective identification information) for identifying at least one radio node or cell observed (e.g. by the device or a component thereof, such as a GNSS receiver) at the at least one position of the device. This may comprise example cases where the set of fingerprint information comprises, per position, respective identification information for identifying one radio node only, a plurality of radio nodes, one cell only, a plurality of cells, one radio node and one cell only, a plurality of radio nodes and a plurality of cells, to name but a few examples. An example of identification information is for instance an identifier. Identification information may for instance comprise a system-wide identifier and/or a local identifier. The cells observed at the at least one position may for instance be serving cells of one or more communication systems and/or neighbor cells of one or more communication systems. An observed serving cell may be of a first communication system, and the neighbor cells may be of one or more communication systems that include or exclude the first communication system.

At least one check is performed at least with the at least one set of fingerprint information to determine if the at least one set of fingerprint information contains at least one error, for instance with only one set of fingerprint information or with a plurality of sets of fingerprint information. Equally well, a plurality of checks can be performed with the at least one set of fingerprint information (or with a plurality of sets of fingerprint information) to determine respective errors in the at least one set of fingerprint information (or in the plurality of sets of fingerprint information). Several examples of such checks will be given below.

Based at least one a result of the at least one check, a process for collecting and/or providing fingerprint information (e.g. one or more sets of fingerprint information) is controlled. The control of the process may for instance only take place if at least one error is detected. However, if the control is for instance a start of the process or a resuming of the stopped process, the control of the process may also take place if it is found that the at least one set does not contain an error. The type of control to be exerted is for instance linked to the check performed, as will be seen from the examples of checks provided below.

The checking according to step 102 of FIG. 1 may for instance be performed before the process of collecting and/or providing fingerprint information is performed. It may for instance be checked prior to the first provision of fingerprint information (e.g. in a commissioning phase of the device) if sets of fingerprint information are erroneous or not, and the process of collecting (e.g. producing) and/or providing fingerprint information may be controlled (e.g. calibrated) before it is started. To this end, e.g. a plurality of sets of fingerprint information (e.g. spanning a fingerprint collection over several hours or days) may be gathered as a test set, on which then one or more checks are performed. Depending on the results of these checks, the process may then be controlled (e.g. calibrated) accordingly. To allow for an easy control, the process for collecting and/or providing fingerprint information may for instance have one or more parameters that can be set accordingly to exert certain control actions on this process. For instance, there may be one or more parameters for activating and/or deactivating collection and/or provision of respective types of information, in particular respective type of identification information. For instance, the may be a parameter for turning on and off collection and provision of identification information of neighbor cells, and/or a parameter for turning on and off collection and provision of local identifiers for serving cells. Equally well, the checking according to step 102 of FIG. 1 may for instance be performed while the process for collecting and/or providing fingerprint information is already running. The checking may then for instance be based on at least one set of fingerprint information produced by the process of collecting and/or providing fingerprint information. The checking may then for instance be performed as a background task. In case of at least one detected error, the process of collecting and/or providing fingerprint information may be controlled accordingly (for instance either on the fly or by stopping, accordingly re-configuring/recalibrating and restarting the process).

The checking of step 102 (and, depending on its results, also the controlling of step 103) may for instance be (or have to be) performed (e.g. as a background task) when a property of a pre-defined set of one or more properties of the device changes. The properties of the set of one or more properties may for instance be properties that are considered to potentially cause, when changed, errors in the process of collecting and/or providing fingerprint information. Such properties may for instance be a firmware of the device, an operating system of the device, a software of the process for collecting and/or providing fingerprint information, hardware drivers for components such as a radio interface module, etc.

The checking of step 102 (and, depending on its results, also the controlling of step 103) may additionally or alternatively for instance be (or have to be) performed (e.g. as a background task) when a new representation of at least one check to be performed and a representation of the according controlling to be performed is obtained at the device, e.g. from an apparatus that performs the method of FIG. 2. It is then possible to account for errors that are not yet checked for at the device but have been discovered e.g. by analysis of sets of fingerprint information from a plurality of devices. Such an analysis may for instance be performed by radiomap generation and/or updating apparatus 5 of FIG. 3, or by another apparatus or person. Alternatively, errors may be discovered based on tests performed with new devices or devices with new property constellations (e.g. after firmware updates, operation system changes, etc.). For instance, a plurality of sets of fingerprint information provided (for instance in standardized test scenarios) by a new device or a device with a new property constellation may be compared against reference sets of fingerprint information to detect potential errors. If errors are detected, according representations of one or more checks to be performed and representations of one or more respective control actions to be taken on affected devices (e.g. on devices corresponding to the tested device or on devices of the same class (e.g. the same manufacturer)) are then provided to the affected devices, for instance by pushing according updates containing these representations to the affected devices. Equally well, representations of one or more checks to be performed and representations of one or more respective control actions to be taken could be provided to all devices (including the affected devices) that can receive and process such representations.

The method of FIG. 2 may be performed by an apparatus (e.g. a processor), e.g. a provision apparatus (e.g. a server like for instance an app server or update server). The representations are either provided (by the apparatus) or caused to be provided (e.g. by a component that is different from the apparatus), for instance to the apparatus that performs the method of FIG. 1 or to a device that comprises this apparatus. The representations may then for instance provide the basis for the checking in step 102 of FIG. 1 and the controlling in step 103 of FIG. 1. The representations may for instance be respective computer program codes or a joint computer program code, or may be rules and associated control instructions, as already explained above. The representations may pertain to one or more checks and respective control instructions.

In example embodiments of the invention, the methods of FIG. 1 and FIG. 2 have the further feature that the at least one check is performed by the device or by a component thereof, and that the process for collecting and/or providing fingerprint information is controlled by the device or by a component thereof. Both components may for instance be a processor of the device, as has already been explained with reference to FIGS. 4a and 4b above.

In example embodiments of the invention, the methods of FIG. 1 and FIG. 2 have the further feature that the at least one check requires information from several sets of fingerprint information including the at least one set of fingerprint information. This allows for instance to check consistency of identification information and adaptation of identification information after changes such as for instance handovers.

In example embodiments of the invention, the methods of FIG. 1 and FIG. 2 have the further feature that the at least one error is an error of at least a part of the identification information contained in the at least one set of fingerprint information and/or of at least a part of identification information contained in the set of fingerprint information for identifying an area that comprises the at least one of a radio node and a cell, but not an error of position information representative of the at least one position of the device and contained in the at least one set of fingerprint information. It may for instance be the case that all errors for the detection of which checks are performed are errors of at least parts of the identification information rather than errors in the position information.

In example embodiments of the invention, the methods of FIG. 1 and FIG. 2 have the further feature that the controlling of the process for collecting and/or providing fingerprint information comprises at least one of stopping, suspending, not starting, starting and resuming at least one of collecting and providing at least a part of the fingerprint information. As explained above, the controlling of the process may be performed by a process that runs before the process for collecting and/or providing fingerprint information, or while the process for collecting and/or providing fingerprint information is already running. In the former case, the control may for instance be to start or not to start collecting and/or providing at least a part (or even all) of the fingerprint information, while in the latter case, the control may for instance be to stop, suspend or resume collecting and/or providing at least a part (or even all) of the fingerprint information. For instance, collection and provision may be controlled, or only either one of collection or provision may be controlled.

In the following, non-limiting examples of checks to be performed in step 102 of FIG. 1 (and to be provided or caused to be provided as representations in step 201 of FIG. 2) are presented with reference to FIGS. 7a-11b. Only one of these checks, or some of these checks, or all of these checks may be performed in step 102 of FIG. 1 (and may be provided or caused to be provided as representations in step 201 of FIG. 2).

In an example embodiment of the methods of FIGS. 1 and 2, a check of the at least one check (see step 102 of FIG. 1 and step 201 of FIG. 2) comprises checking if a change of second-type identification information of one of a radio node and a cell (e.g. of the at least one radio node or cell on which identification information is comprised in the at least one set of fingerprint information) that has identical first-type identification information in a plurality of sets of fingerprint information including the at least one set of fingerprint information occurs within this plurality of sets of fingerprint information, such a change being considered as an error.

The first-type identification information may for instance be one of a system-wide identification information and a local identification information, and the second-type identification information may then for instance be the other one of the system-wide identification information and the local identification information.

In case that such a change is identified (meaning that the system-wide and local identifiers for the same radio node or cell get out of synchronism), the process for at least one of collecting and providing fingerprint information may then for instance be controlled (see step 103 of FIG. 1 and step 202 of FIG. 2) so that at least the second-type identification information is not at least one of collected and provided (e.g. in one or more sets of fingerprint information) at least for one of a radio node and a cell having a status from a set of at least two pre-defined status that equals a status of the one of a radio node and a cell for which the change of the second-type identification information was identified and/or a type from a set of at least two pre-defined types that equals a type of the one of a radio node and a cell for which the change of the second-type identification information was identified.

The set of at least two pre-defined status of the radio node or cell may for instance comprise a serving cell status and a neighbor cell status. Thus, it may for instance be decided that for serving cells, no local identifiers shall be collected and/or provided, or that for neighbor cells, no system-wide identifiers shall be collected and/or provided.

The type of the radio node or cell may for instance pertain to a technology and/or generation of a cellular communication system. The set of at least two pre-defined types of the radio node or cell may for instance comprise a 2G cellular, 3G cellular or 4G cellular type. Examples of such 2G, 3G and 4G cellular communication systems have already been presented above. It may thus for instance be decided that for 3G cells, no local identifiers shall be collected and/or provided.

Furthermore, when status and type are combined, it may for instance be decided that for 3G serving cells, no local identifiers shall be collected and/or provided (while for 2G serving cells, local identifiers may still be collected and/or provided).

Also the first-type identification information may not be collected and/or provided, if it is determined that changes occur randomly in the second-type identification information and/or in the first-type identification information. Such random changes may be considered as an indication that the fingerprint information collecting and/or provision process is instable in its entirety.

Figure 7A:
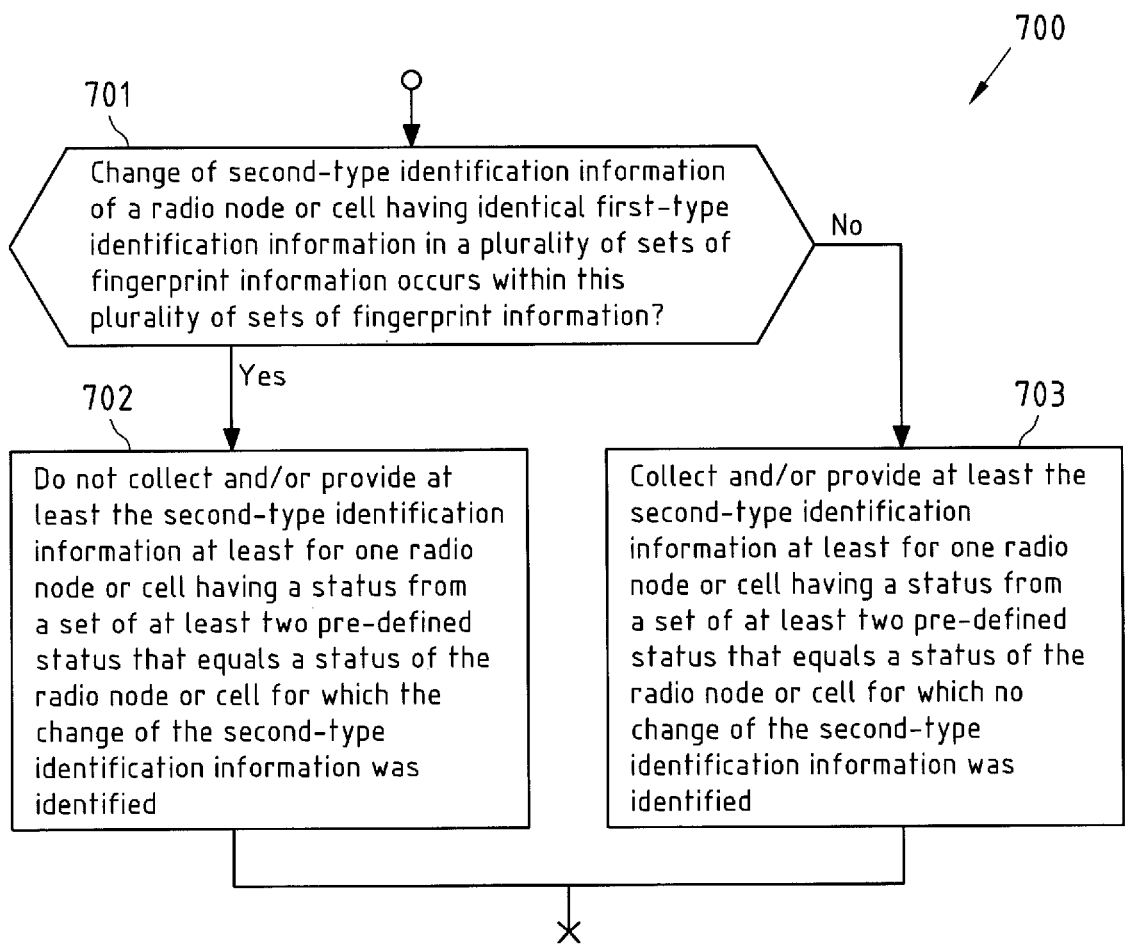
FIG. 7a is a flowchart illustrating an example of a check to be performed on at least one set of fingerprint information and the according fingerprint information collection/provision control according to the invention.

FIG. 7a is a flowchart 700 illustrating the present example embodiment.

In a step 701, it is checked if a change of second-type identification information of a radio node or cell having identical first-type identification information in a plurality of sets of fingerprint information occurs within this plurality of sets of fingerprint information.

If this is the case, step 702 is entered, and at least the second-type identification information at least for one radio node or cell having a status from a set of at least two pre-defined status that equals a status of the radio node or cell for which the change of the second-type identification information was identified is not collected and/or provided.

Otherwise, step 703 is entered, and at least the second-type identification information at least for one radio node or cell having a status from a set of at least two pre-defined status that equals a status of the radio node or cell for which no change of the second-type identification information was identified is collected and/or provided.

Therein, additionally or alternatively with respect to the status, also a type of the radio node or cell could be considered in steps 702 and 703, as described above.

The present example embodiment may for instance take the shape that it is checked if a given serving cell (consistently identified by its system-wide (e.g. global) cell identifier) always has, in addition, the same local (e.g. physical layer) identifier (in e.g. WCDMA network this may for instance be the UARFCN-DL and P-CPICH) in a plurality of sets of fingerprint information. If this is not the case, then it may be advantageous not to collect physical cell identifier of the serving at all.

The present example embodiment may alternatively also be performed with respect to the neighbor cells, in case that a modem (e.g. the radio interface unit) of the device reports the system-wide (e.g. global) cell identifiers for those cells as well (in addition to the local (e.g. physical layer) identifiers). The practice has shown that the modems/APIs often have issues in correctly assigning system-wide cell identifiers to neighbor cells. It is thus checked if the system-wide identifier for at least one neighbor cell (that is consistently identified by the same local identifier) is found to be unstable, and if this is found to be true, the system-wide identifiers for the neighbor cells are not collected and/or provided.

In a further example embodiment of the methods of FIGS. 1 and 2, the previously presented example embodiment is further refined by requiring that the check (see step 102 of FIG. 1 and step 201 of FIG. 2) further comprises checking whether the change only occurs in a context of a change of an association of the device from a previous one of a radio node and a cell to a new one of a radio node and a cell (e.g. in a context of a hand-over of the device from one radio node/cell to another radio node/cell), and if this is found to be true, the process for at least one of collecting and providing fingerprint information is controlled (see step 103 of FIG. 1 and step 202 of FIG. 2) so that, in a time interval that is associated with at least one such a change of association and has one of a defined length and an end marked by a detection that a defined condition is met, at least the second-type identification information is not at least one of collected and provided (e.g. in one or more sets of fingerprint information) at least for one of a radio node and a cell having a status from a set of at least two pre-defined status that equals a status of the one of a radio node and a cell for which the change of the second-type identification information was identified and/or a type from a set of at least two pre-defined types that equals a type of the one of a radio node and a cell for which the change of the second-type identification information was identified.

Therein, the time interval may for instance start with the change of the association. The defined length may for instance be a pre-defined length (e.g. 1, 5, 10 or 20 seconds, to give but a few examples). Alternatively, the end of the interval may be marked by a detection (e.g. by the device or by a component thereof, e.g. a processor) that a defined (e.g. pre-defined) condition is met, which condition may for instance be that also a change in the second-type identification has happened, for instance so that the first-type identification information and the second-type identification information now pertain to the same radio node or cell. As in the previous example embodiment, the status of the radio node or cell for which the change of the second-type identification information was identified may be a serving cell status, and the second-type identification information may then for instance be local identification information (but equally well system-wide identification information). Equally well, the status of the radio node or cell for which the change of the second-type identification information was identified may be a neighbor cell status, and the second-type identification information may then for instance be system-wide identification information (but equally well local identification information). Also the type of the radio node or cell may for instance pertain to a technology and/or generation of a cellular communication system. The set of at least two pre-defined types of the radio node or cell may for instance comprise a 2G cellular, 3G cellular or 4G cellular type. And as in the example embodiment above, status and type may be combined.

Figure 7B:
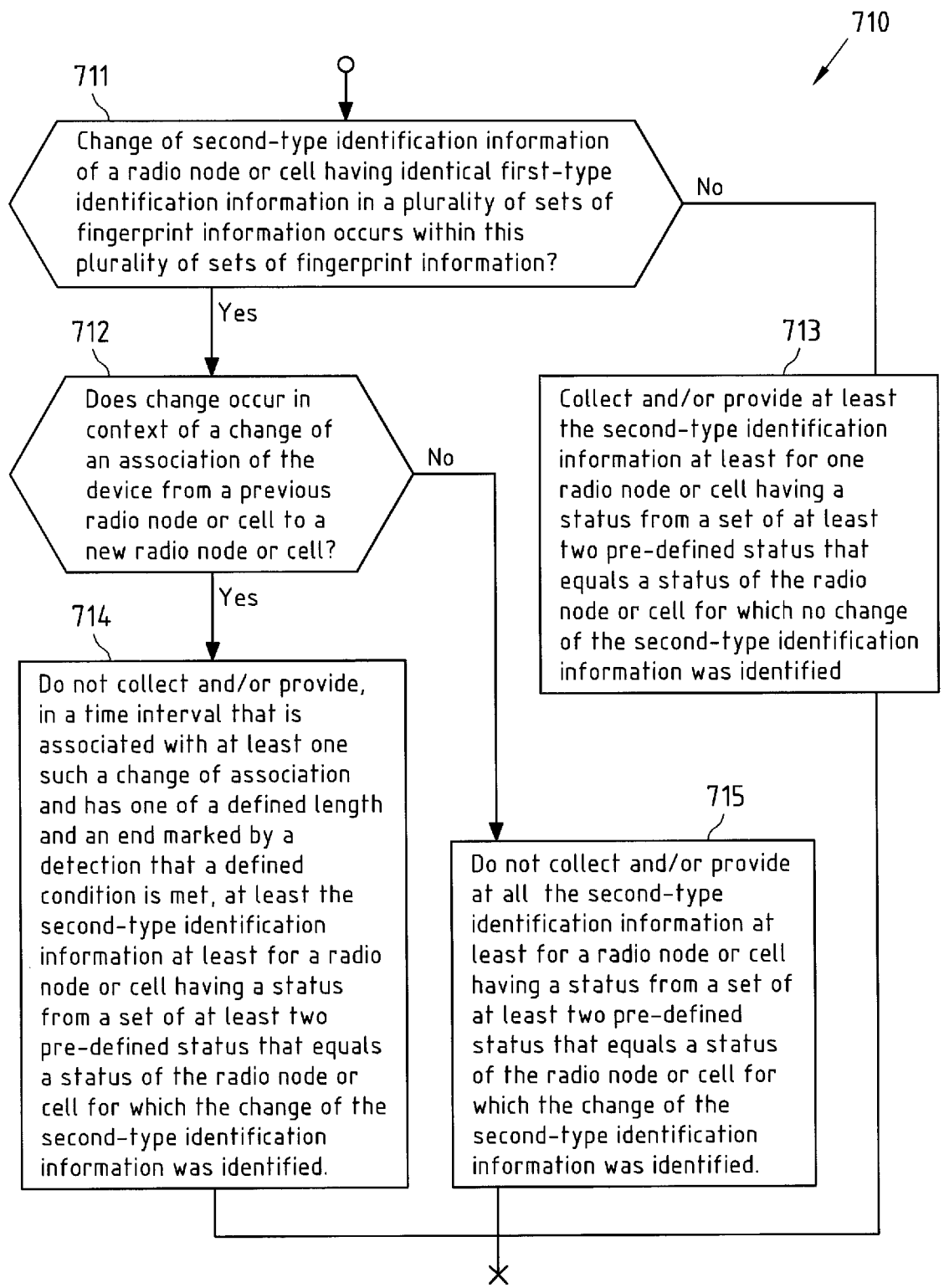
FIG. 7b is a flowchart illustrating a further example of a check to be performed on at least one set of fingerprint information and the according fingerprint information collection/provision control according to the invention.

FIG. 7b is a flowchart 710 illustrating the present example embodiment.

In a step 711, it is checked if a change of second-type identification information of a radio node or cell having identical first-type identification information in a plurality of sets of fingerprint information occurs within this plurality of sets of fingerprint information.

If this is the case, it is checked in step 712, if the change occurs in the context of a change of an association of the device from a previous radio node or cell to a new radio node or cell.

If this is the case, in step 714, in a time interval that is associated with at least one such a change of association and has one of a defined length and an end marked by a detection that a defined condition is met, at least the second-type identification information at least for a radio node or cell having a status from a set of at least two pre-defined status that equals a status of the radio node or cell for which the change of the second-type identification information was identified is not collected and/or provided. The collection/provision is thus only suspended for a limited time interval (e.g. until the second-type identification also correctly reflects the change of the association).

Otherwise, in step 715, the second-type identification information is not collected and/or provided at all at least for a radio node or cell (or for all radio nodes or cells) having a status from a set of at least two pre-defined status that equals a status of the radio node or cell for which the change of the second-type identification information was identified. Thus there appears to be an issue with the second-type identification information for radio nodes or cells with this status, so that no second-type identification information should be collected and/or provided for them.

Step 713 is performed when the check in step 711 yields a negative result. Then at least the second-type identification information at least for one radio node or cell (or all radio nodes or cells) having a status from a set of at least two pre-defined status that equals a status of the radio node or cell for which no change of the second-type identification information was identified is collected and/or provided.

Since there is no inconsistency with respect to the second-type identification information, the second-type identification information can thus be collected and/or provided without restriction.

Therein, additionally or alternatively with respect to the status, also a type of the radio node or cell could be considered in steps 713-715, as described above.

In the present example embodiment, in comparison to the previous example embodiment, thus an additional analysis is made (step 712), if for instance the local (e.g. physical layer) identifier and the system-wide (e.g. global) cell identifier of the serving cell are out-of-sync only after a cell reselection/handover. If this is the case, it's better not to collect and/or provide at least the local identifier for the serving cell immediately after the change of the serving cell, but to wait until the local identifier changes as well. Note that it may also happen that the local identifier gets updated first (then for instance the system-wide identifier should not be collected and/or provided until it has changed to the correct value). In any case, both the system-wide identifier and the local identifier should change within a fairly short time interval (e.g. a few seconds).

Again, as in the previous example embodiment, if it seems that the local identifier and/or the system-wide cell identifier change randomly for a serving cell and/or a neighbor cell (e.g. a local identifier changes suddenly, but there's e.g. several minutes to the previous and next system-wide identifier change), then it may be a sign of instable measurements and the whole fingerprint information collection and/or provision from the device should get terminated.

In a further example embodiment of the methods of FIGS. 1 and 2, a check (see step 102 of FIG. 1 and step 201 of FIG. 2) of the at least one check comprises checking if a set of fingerprint information of the at least one set of fingerprint information comprises duplicate identification information, presence of such duplicate identification information being considered as an error. The duplicate identification information may for instance be identification information of a type of which identification information already exists in the set of fingerprint information. The type of identification information may for instance be system-wide or local identification information. A system-wide identifier or a local identifier of the same radio node or cell may thus for instance be contained two or more times in a set of fingerprint information.

The duplicate identification information may for instance be associated with measurement information (e.g. information on RSS and/or pathloss and/or timing measurements) also included in the set of fingerprint information. Also information with respect to which the duplicate identification information is duplicate may be associated with measurement information and included in the set of fingerprint information, which may however be different from the measurement information associated with the duplicate identification information and thus may be contradictive. As an example, there may thus be, in the same set of fingerprint information, two or more instances of a system-wide or local identifier of the same radio node or cell with respectively associated different measurement information (e.g. in the form "ID=1, RSS=100 dBm" and "ID=1, RSS=95 dBm").

In case that such duplicate identification information is identified, the process for at least one of collecting and providing fingerprint information may then for instance be controlled (see step 103 of FIG. 1 and step 202 of FIG. 2) so that at least the duplicate identification information is not provided. This may for instance comprise removal of at least the duplicate identification information from the at least one collected set of fingerprint information and provision of this reduced set of fingerprint information. Equally well, information associated with the duplicate identification information, such as associated measurement information, may for instance be removed from the at least one collected set of fingerprint information as well. Furthermore, both the duplicate identification information and the identification information with respect to which the duplicate identification information is duplicate may be removed from the set of fingerprint information. If the duplicate identification information and the identification information with respect to which the duplicate identification information is duplicate are associated with respective measurement information, this respective measurement information may then for instance be removed as well.

Figure 8:
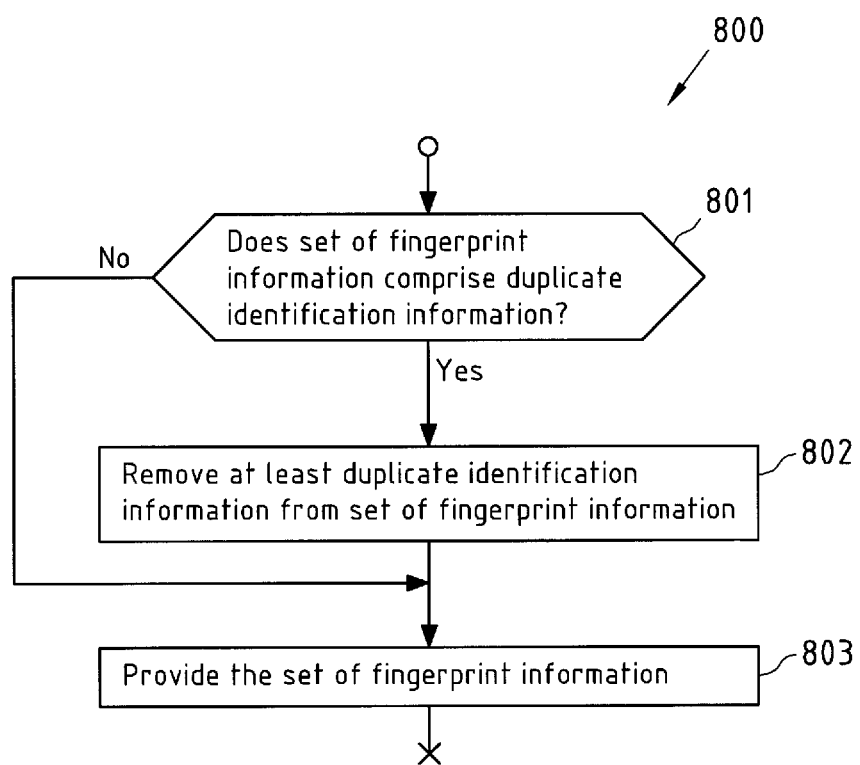
FIG. 8 is a flowchart illustrating a further example of a check to be performed on at least one set of fingerprint information and the according fingerprint information collection/provision control according to the invention.

FIG. 8 is a flowchart 800 illustrating the present example embodiment.

Therein, in a step 801, it is checked if a set of fingerprint information comprises duplicate identification information. If this is not the case, the flowchart skips step 802. Otherwise, step 802 is performed and at least the duplicate identification information is removed from the set of fingerprint information. In step 803, the set of fingerprint information (without the duplicate identification) is then provided.

The check for duplicate identification information is a check that can be performed on a single set of fingerprint information without a need to refer to multiple sets of fingerprint information. The controlling may be limited to the process of providing fingerprint information, but may not be directed to the process of collecting fingerprint information, since the sets of fingerprint information have to be collected first to be able to inspect if duplicates are present.

Presence of duplicate identification information in terms of local identifiers or system-wide identifiers may indicate issues in the fingerprint collection, but does generally not invalidate the fingerprint information. It is thus sufficient to remove the duplicate identification information to reduce the amount of information provided to the radiomap generation/updating apparatus.

In a further example embodiment of the methods of FIGS. 1 and 2, a check of the at least one check (see step 102 of FIG. 1 and step 201 of FIG. 2) comprises checking if identification information of one of a radio node and a cell that is associated with the device, is of a first status and belongs to a first communication system changes after a change of this association to an association of the device with one of a radio node and a cell that has the same first status but belongs to a second communication system that is different from the first communication system, and considering absence of such a change of the identification information at least within a defined time interval after the change of this association as an error.

Therein, the first status may for instance be a serving cell status or a neighbor cell status. The check is for instance based on a plurality of sets of fingerprint information, for instance to be able to detect the change of the identification information. The first status may for instance not be actively checked, in particular if the sets of fingerprint information involved in the check only comprise identification information for radio nodes or cells of the first status. The change of the association may for instance be an inter-system handover, i.e. a handover between two communication systems, e.g. from a WCDMA system to a GSM or GERAN (GSM Enhanced Data Rates for GSM Evolution (EDGE) RAN) communication system. The defined time interval may for instance be a pre-defined time interval (e.g. a time interval with a pre-defined length, e.g. 1, 2, 5 or 10 seconds, to name but a few example values). The time interval may for instance start with the change of the association. The end of the time interval may for instance be defined as the time instant when the first set of fingerprint information after the change of the association is produced or obtained. It may then for instance be checked if the first set of fingerprint information after the change of the association already contains the changed identification information, and considering absence of such a change as an error.

In case that such an absence of a change of the identification information at least within the defined time interval after the change of this association is detected, the process for at least one of collecting and providing fingerprint information may for instance be controlled (see step 103 of FIG. 1 and step 202 of FIG. 2) so that at least identification information of at least one of a radio node and a cell having the first status is not at least one of collected and provided after such change of association at least within a time interval that has one of a defined length and an end marked by a detection that the change of the identification information for the at least one of a radio node and a cell for which the identification information is not at least one of collected and provided has occurred. The time interval may for instance start with the change of the association.

The defined length of the time interval may for instance be a pre-defined length, e.g. 5, 10 or 20 seconds, to name but a few example values). Alternatively, the time interval may be defined to end when it is detected that the change of the identification information has now occurred.

Figure 9:
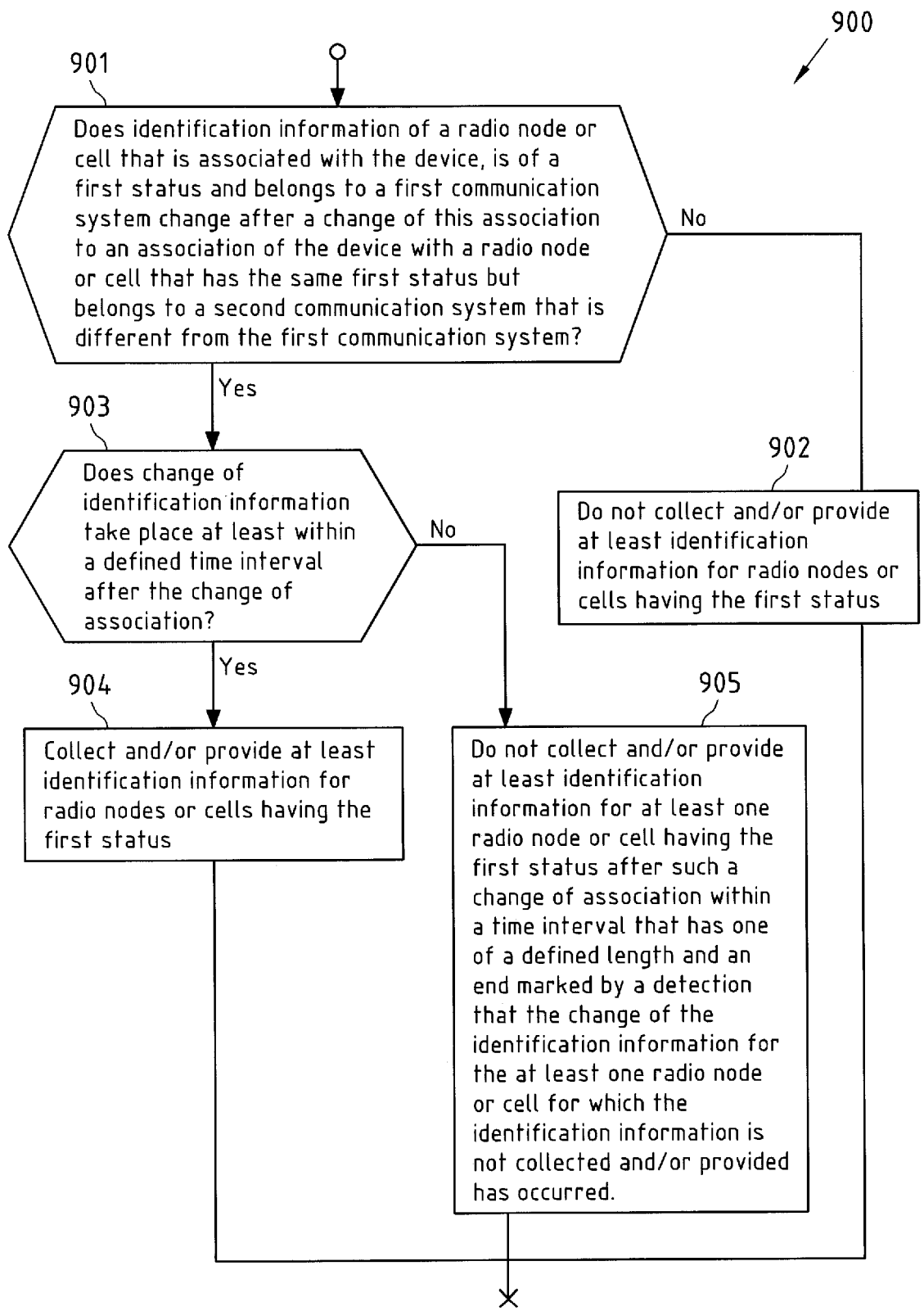
FIG. 9 is a flowchart illustrating a further example of a check to be performed on at least one set of fingerprint information and the according fingerprint information collection/provision control according to the invention.

FIG. 9 is a flowchart 900 illustrating the present example embodiment.

In a step 901, it is checked if identification information of a radio node or cell that is associated with the device, is of a first status and belongs to a first communication system change after a change of this association to an association of the device with a radio node or cell that has the same first status but belongs to a second communication system that is different from the first communication system.

If this is found to be true, in a step 903, it is checked if the change of identification information takes place at least within a defined time interval after the change of association (e.g. immediately or at least when the next set of fingerprint information is obtained or produced, as described above).

If this check is true, there is no need to suspend collection and/or provision of the identification information for radio nodes or cells having the first status, and accordingly, in step 904, at least identification information for radio nodes or cells having the first status is collected and/or provided.

If the check of step 903 is not true, there is apparently a delay in the change of the identification information. Accordingly, in step 905, it is prescribed that at least identification information for at least one radio node or cell having the first status is not collected and/or provided after such a change of association within a time interval that has one of a defined length and an end marked by a detection that the change of the identification information for the at least one radio node or cell for which the identification information is not collected and/or provided has occurred.

If the check in step 901 is not true, the identification does not change at all, so it is instructive, according to step 902, not to collect and/or provide at least identification information for radio nodes or cells having the first status.

The present example embodiment may for instance take the shape that it is checked if the system-wide cell identifier changes, when there is an inter-system handover, e.g. from a WCDMA network to GERAN communication system. It may of course be possible that the cells of the two communication systems have the same system-wide identifier at the given location, but this is a somewhat implausible scenario which justifies performing an according check. Then if the system-wide identifier is found not to change, a remedy is for instance that after the inter-system handover, at least the system-wide identifier is not collected until the system-wide identifier has changed. Such a remedy may require that an apparatus that performs the present example embodiment has some independent source of information regarding the active communication system, e.g. to be able to sense that an inter-system handover has taken place. This knowledge may for instance be obtained from the radio interface unit. For instance, the radio interface unit (e.g. a cellular modem as a part thereof) may know which radio access protocol (for instance a 2G, 3G or 4G radio access protocol) the device is currently using, and thus it can signal this information to the apparatus that performs the method of FIG. 1, for instance via a defined Application Programming Interface (API).

The present example embodiment may alternatively be used to check if the list of one or more (e.g. system-wide and/or local) identifiers of observed neighbor cells (and possibly further measurements) changes in case of an inter-system handover. Sometimes at the handover situation a modem (e.g. the radio interface unit) of the device still reports the previous neighbor cell identifiers for some time. If this is the case, a remedy is for instance that after the inter-system handover, neighbor cell identifiers are not collected and/or provided until the list of neighbor cell identifiers changes.

In a traditional fingerprint information provision implementation, detecting the change of the neighbor cell identifiers may for instance be easy to accomplish, since the fingerprint information (including the neighbor cell identifiers) substantially differ for different communication systems. This can be seen from the different Local Cell IDs of the different networks/systems shown in the table presented above, or the Global Cell IDs that are also substantially different in particular for GSM, WCDMA/TS-SCDMA/LTE and CDMA The change of the neighbor cell identifiers may thus for instance be already detected from a format change of the fingerprint information. Additionally or alternatively, there may be an identifier of the respective radio interface type to which the neighbor cell measurement pertains within the fingerprint information, so that a change of the neighbor cell identifiers may for instance be detected based on the change of the identifier. Additionally or alternatively, even in case that the fingerprint information format should be the same at least with respect to the neighbor cell identifiers before and after the inter-system handover (and if no identifier for the radio interface type may be included in the fingerprint information), a change of the neighbor cell identifiers may be detected based on the neighbor cell identifiers themselves, i.e. based on a change of one or more neighbor cell identifiers to one or more different neighbor cell identifiers.

In a further example embodiment of the methods of FIGS. 1 and 2, a check of the at least one check (see step 102 of FIG. 1 and step 201 of FIG. 2) comprises checking if at least a part of respective identification information for identifying an area that comprises one of a radio node and a cell (of the at least one radio node and cell) is different in at least two sets of fingerprint information of the at least one set of fingerprint information, and considering such a difference as an error. It is thus checked if the part of the identification information is different with respect to the same radio node or cell (e.g. with respect to a radio node or cell identified by the same identification information) in the at least two sets of fingerprint information.

The area may for instance comprise one or more radio nodes or cells. The area may for instance be a tracking area or a paging area. In this area, the device may for instance be assumed by a communications system to be located when the device is in idle state. The part of the identification for identifying an area that comprises the radio node or cell may for instance be a Local Area Code (LAC) (e.g. of a WCDMA or TD-SCDMA communication system), or a Tracking Area Code (TAC) (e.g. of a EUTRA cell of an LTE communication system). An area that comprises one or more radio nodes or cells of a WCDMA or TD-SCDMA communication system may for instance be identified in a system wide manner by identification information comprising an MCC, an MNC and the LAC. Similarly, in an EUTRA/LTE system, an area that comprises one or more radio nodes or cells may for instance be identified in a system wide manner by identification information comprising an MCC, an MNC and the TAC.

Both the LAC and the TAC may often not properly be decoded by devices. Thus the error may occur that in a first set of fingerprint information, a TAC or LAC is contained that is associated with identification information for a radio node or cell, and in a second set of fingerprint information, a different TAC or LAC is contained that is associated with identification information for the same radio node or cell, which cannot be the case.

In case that such a difference is detected, the process for at least one of collecting and providing fingerprint information is for instance controlled (see step 103 of FIG. 1 and step 202 of FIG. 2) so that at least the part of the identification information (e.g. the LAC or TAC) is not at least one of collected and provided for at least one of a radio node and a cell (e.g. a radio node and/or cell comprised in an area to which the part of the identification information pertains).

Figure 10:
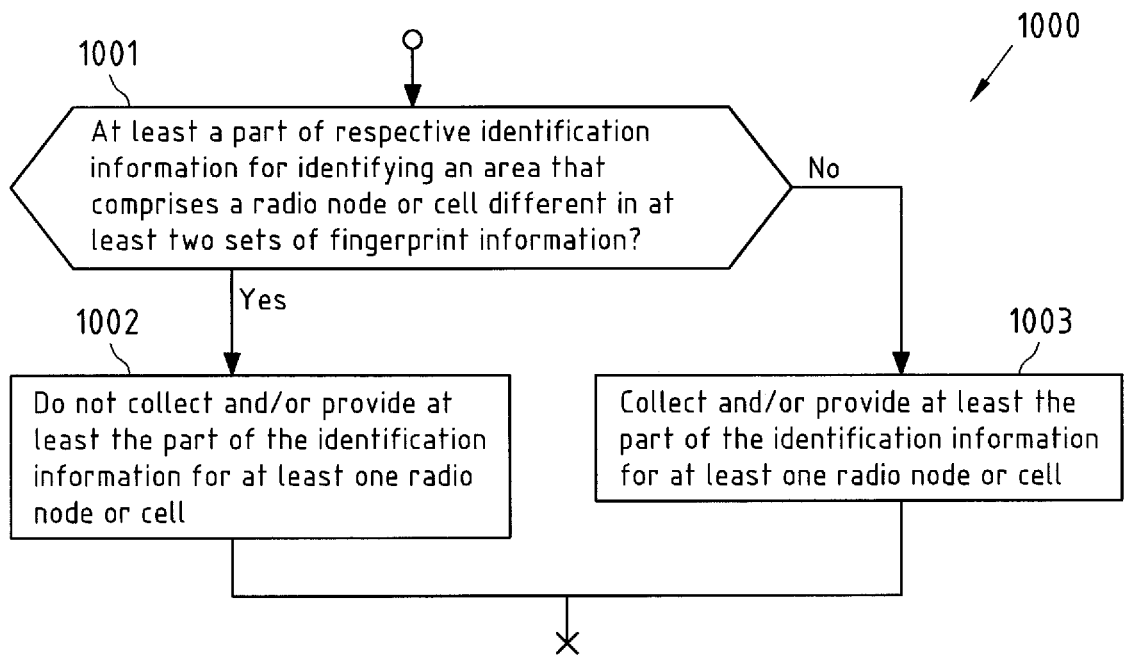
FIG. 10 is a flowchart illustrating a further example of a check to be performed on at least one set of fingerprint information and the according fingerprint information collection/provision control according to the invention.

FIG. 10 is a flowchart 1000 illustrating the present example embodiment.

In a step 1001, it is checked if at least a part of respective identification information for identifying an area that comprises a radio node or cell is different in at least two sets of fingerprint information.

If this is the case, step 1002 is entered, and at least the part of the identification information is not collected and/or provided for at least one radio node or cell (or for instance for all radio nodes or cells).

Otherwise, in step 1003, at least the part of the identification information for at least one radio node or cell (or for instance for all radio nodes or cells) is collected and/or provided. In a further example embodiment of the methods of FIGS. 1 and 2, a check of the at least one check (see step 102 of FIG. 1 and step 201 of FIG. 2) comprises checking if respective identification information of a radio node or cell stays the same in at least two sets of fingerprint information, although a difference of respective positions represented by respective position information in these at least two sets of fingerprint information is one of larger and larger-or-equal compared to a pre-defined threshold, and considering a confirmative result (i.e. a finding that the check condition is true) of the checking as an error.

The checking for an error in the present example embodiment thus requires analyzing the radio node or cell identifiers with respect to position information of at least two sets of fingerprint information.

For instance, differences that are larger than an average size (e.g. in terms of a diameter of a circle or the major axis of an ellipse) of a coverage area associated with the radio node or cell may indicate that the identification information should have changed, e.g. that the identification information is not decoded properly. The threshold may for instance be related to a size (or extension) of a coverage area associated with the radio node or cell, e.g. an average size (or extension). Alternatively, the threshold may depend on a type of radio node or cell identified by the identification information. For instance, coverage area of radio nodes or cells of different communication systems may have different sizes, so that it is beneficial to adapt the threshold to these different coverage area sizes.

In case of such a confirmative result of the checking, the process for at least one of collecting and providing fingerprint information may for instance be controlled (see step 103 of FIG. 1 and step 202 of FIG. 2) so that at least no identification information is at least one of collected and provided at least for the at least one radio node or cell (or for instance for all radio nodes or cells for which it is detected that the respective identification information should have changed).

Alternatively, in case of such a confirmative result of the checking, the process for at least one of collecting and providing fingerprint information may for instance be controlled (see step 103 of FIG. 1 and step 202 of FIG. 2) so that at least no identification information is at least one of collected and provided at least for at least one of a radio node and a cell (or for any radio nodes and/or cells of a pre-defined type, e.g. for all cells) during a pre-defined state of the device. The radio node or cell may for instance be a serving cell. The identification information may for instance be system-wide identification information.

The pre-defined state may for instance be a state that is considered to be associated with the error. The state may for instance be a state in which a voice call is active at the device, and a remedy may then for instance be not to collect and/or provide at least identification information for any radio nodes or cells (e.g. for any serving cells and/or neighbor cells) during a voice call. The state in which a voice call is active may for instance be a CELL_DCH state in a UMTS communication system. CELL_DCH is a dedicated state in a Radio Resource Control (RRC) of a UMTS communication system, in which a dedicated physical channel is allocated to the UE (User Equipment) in uplink and downlink, the UE is known on cell level according to its current active set, and dedicated transport channels, downlink and uplink shared transport channels, and a combination of these transport channels can be used by the UE. In the CELL_DCH state, a modem (e.g. a radio interface unit) of the device has a dedicated connection with the base station of a cell, and may simply report the cell identifier of the cell in which the device was when it entered the CELL_DCH state (but not any cell changes that occur later).

Information on when a voice call is active and when it is no longer active may for instance be provided by the radio interface unit (e.g. by a modem thereof).

A further example of the pre-defined state is a state in which the WLAN connectivity of the device is disabled. Fingerprint information may then frequently still contain identification information for radio nodes (e.g. WLAN access points) that were observed before WLAN connectivity was disabled (some chipsets and/or APIs may for instance report cached WLAN data over an extended period of time, when the WLAN connectivity is set to disabled state). A remedy for this situation is then for instance not to collect and/or provide identification information for WLAN access points during a state in which WLAN connectivity is disabled. This may require knowledge of an apparatus that performs the present example embodiment whether the WLAN connectivity is active or disabled (In the next example embodiment, such knowledge may not be required, since a different criterion is used to decide when identification information on WLAN access points should be provided.)

Figure 11A:
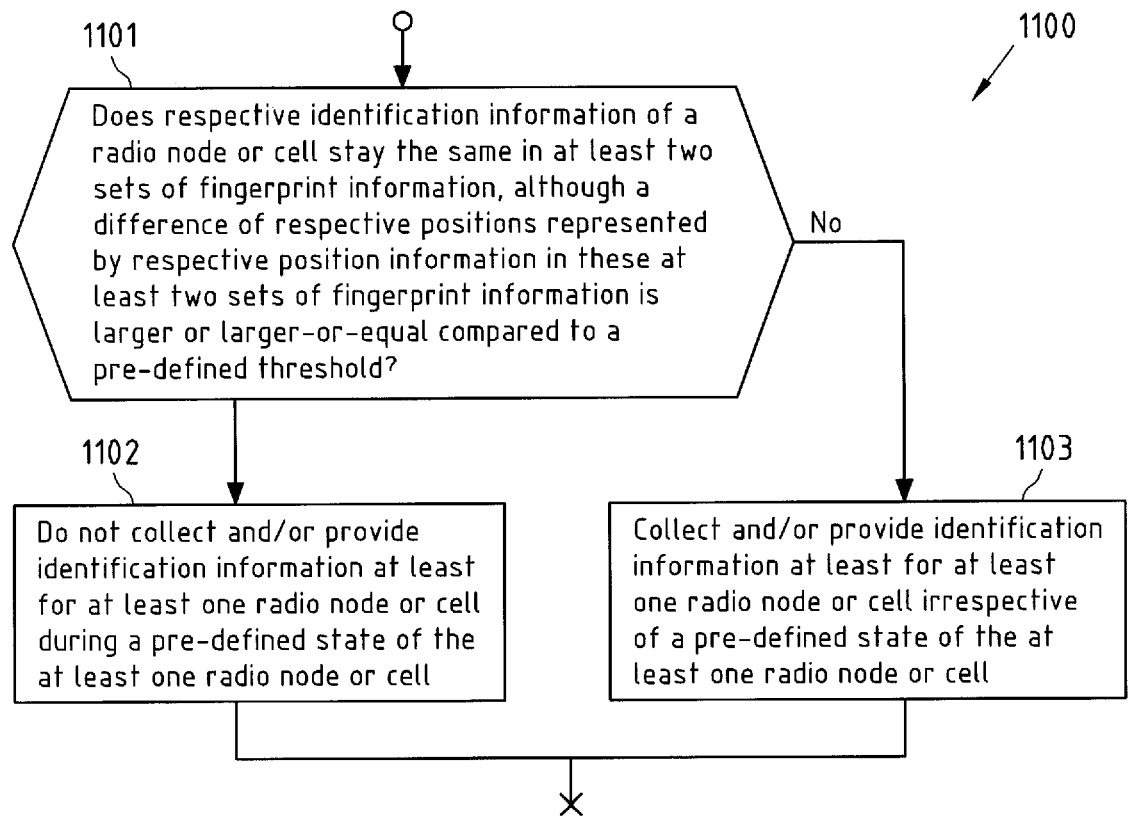
FIG. 11a is a flowchart illustrating a further example of a check to be performed on at least one set of fingerprint information and the according fingerprint information collection/provision control according to the invention.

FIG. 11a is a flowchart 1100 illustrating the present example embodiment.

In a step 1101, it is checked if respective identification information of a radio node or cell stays the same in at least two sets of fingerprint information, although a difference of respective positions represented by respective position information in these at least two sets of fingerprint information is larger or larger-or-equal compared to a pre-defined threshold.

If this is the case, according to step 1102, identification information is not collected and/or provided at least for at least one radio node or cell during a pre-defined state of the at least one radio node or cell (or for instance for all radio nodes or cells during a time period in which they are in the pre-defined state).

Otherwise, according to step 1103, identification information is collected and/or provided at least for at least one radio node or cell irrespective of a pre-defined state of the at least one radio node or cell (or for all radio nodes or cells irrespective of whether they are in the pre-defined state or not).

In a further example embodiment of the methods of FIGS. 1 and 2, a check of the at least one check (see step 102 of FIG. 1 and step 201 of FIG. 2) corresponds to the check performed in the previous example embodiment (see step 1101 of FIG. 11a). However, in case of a confirmative result of the checking, the process for collecting and/or providing fingerprint information is controlled (see step 103 of FIG. 1 and step 202 of FIG. 2) so that at least identification information pertaining to at least one radio node or cell of a class that equals a class of the radio node or cell, for which the checking yielded a confirmative result, is only collected and/or provided upon a detection that the at least one radio node or cell of this class is part of a set of at least one radio node or cell of this class observed at a (e.g. current) position of the device, which set is considered to have changed with respect to a previous set.

Therein, the class may for instance indicate that its members have to be radio nodes or cells of a pre-defined type, e.g. WLAN access points (e.g. in contrast to base stations or cells of cellular communication systems forming another class).

Thus for instance identification information of radio nodes or cells (e.g. WLAN access points) is only collected and/or provided (in particular provided) if the radio nodes or cells are comprised in a set of radio nodes or cells that is considered to have changed with respect to a previous set. A set may for instance be considered to have changed if the number of the set members changes or if at least one set member is replaced by another one.

This efficiently avoids that cached identification information is provided in fingerprint information, without necessarily requiring knowledge on the pre-defined state (e.g. the WLAN connectivity) of the device.

Figure 11B:
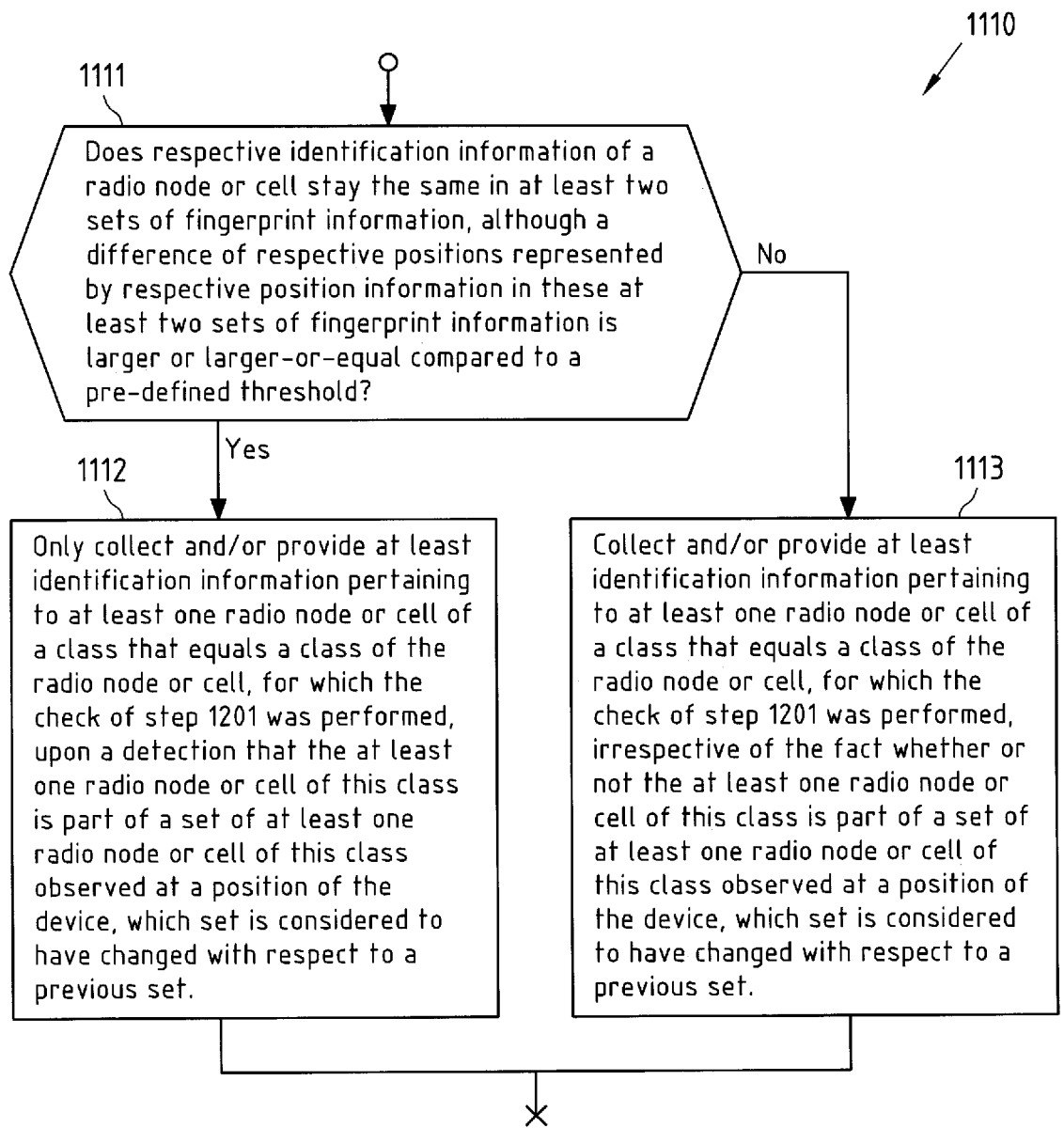
FIG. 11b is a flowchart illustrating a further example of a check to be performed on at least one set of fingerprint information and the according fingerprint information collection/provision control according to the invention.

FIG. 11b is a flowchart 1110 illustrating the present example embodiment.

In a step 1111, it is checked if respective identification information of a radio node or cell stays the same in at least two sets of fingerprint information, although a difference of respective positions represented by respective position information in these at least two sets of fingerprint information is larger or larger-or-equal compared to a pre-defined threshold.

If this is the case, according to step 1112, identification information pertaining to at least one radio node or cell of a class that equals a class of the radio node or cell, for which the check of step 1201 was performed, is only collected and/or provided upon a detection that the at least one radio node or cell of this class is part of a set of at least one radio node or cell of this class observed at a position of the device, which set is considered to have changed with respect to a previous set.

Otherwise, according to step 1113, identification information pertaining to at least one radio node or cell of a class that equals a class of the radio node or cell, for which the check of step 1201 was performed, is collected and/or provided irrespective of the fact whether or not the at least one radio node or cell of this class is part of a set of at least one radio node or cell of this class observed at a position of the device, which set is considered to have changed with respect to a previous set.

In the present specification, any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise disclosure of any one of the following scenarios: (i) A, (ii) B, (iii) A or B, and (iv) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted. The sequence of all method steps presented above is not mandatory, also alternative sequences may be possible.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause an apparatus at least to perform:
   one of producing and obtaining at least one set of fingerprint information, wherein the at least one set of fingerprint information comprises identification information for identifying at least one of a radio node and a cell observed at at least one position of a device;
   performing at least one check at least with the at least one set of fingerprint information to determine if the at least one set of fingerprint information contains at least one error; and
   controlling a process for collecting fingerprint information based at least on a result of the at least one check, such that collecting fingerprint information is modified in response to the controlling of the process.

2. The apparatus according to claim 1, wherein the apparatus is a part of the device or wherein the apparatus and the device are parts of the same unit.

3. The apparatus according to claim 1, wherein the at least one check requires information from several sets of fingerprint information including the at least one set of fingerprint information.

4. The apparatus according to claim 1, wherein the at least one error is an error of at least one of
   at least a part of the identification information contained in the at least one set of fingerprint information and
   at least a part of identification information contained in the set of fingerprint information for identifying an area that comprises the at least one of a radio node and a cell, but not an error of position information representative of the at least one position of the device and contained in the at least one set of fingerprint information.

5. The apparatus according to claim 1, further comprising controlling a process for providing fingerprint information based at least on the result of the at least one check.

6. The apparatus according to claim 5, wherein the controlling of the process for at least one of collecting and providing fingerprint information comprises at least one of stopping, suspending, not starting, starting and resuming at least one of collecting and providing at least a part of the fingerprint information.

7. The apparatus according to claim 5, wherein a check of the at least one check comprises checking if a change of second-type identification information of one of a radio node and a cell that has identical first-type identification information in a plurality of sets of fingerprint information including the at least one set of fingerprint information occurs within this plurality of sets of fingerprint information, such a change being considered as an error.

8. The apparatus according to claim 7, wherein the first-type identification information is one of a system-wide identification information and a local identification information, and wherein the second-type identification information is the other one of the system-wide identification information and the local identification information.

9. The apparatus according to claim 7, wherein in case that such a change is identified, the process for at least one of collecting and providing fingerprint information is controlled so that at least the second-type identification information is not at least one of collected and provided at least for one of a radio node and a cell having at least one of a status from a set of at least two pre-defined status that equals a status of the one of a radio node and a cell for which the change of the second-type identification information was identified and a type from a set of at least two pre-defined types that equals a type of the one of a radio node and a cell for which the change of the second-type identification information was identified.

10. The apparatus according to claim 7, wherein the check further comprises checking whether the change only occurs in a context of a change of an association of the device from a previous one of a radio node and a cell to a new one of a radio node and a cell, and if this is found to be true, the process for at least one of collecting and providing fingerprint information is controlled so that, in a time interval that is associated with at least one such a change of association and has one of a defined length and an end marked by a detection that a defined condition is met, at least the second-type identification information is not at least one of collected and provided at least for one of a radio node and a cell having at least one of a status from a set of at least two pre-defined status that equals a status of the one of a radio node and a cell for which the change of the second-type identification information was identified and a type from a set of at least two pre-defined types that equals a type of the one of a radio node and a cell for which the change of the second-type identification information was identified.

11. The apparatus according to claim 5, wherein a check of the at least one check comprises checking if a set of fingerprint information of the at least one set of fingerprint information comprises duplicate identification information, presence of such duplicate identification information being considered as an error.

12. The apparatus according to claim 11, wherein in case that such duplicate identification information is identified, the process for at least one of collecting and providing fingerprint information is controlled so at least that the duplicate identification information is not provided.

13. The apparatus according to claim 5, wherein a check of the at least one check comprises checking if identification information of one of a radio node and a cell that is associated with the device, is of a first status and belongs to a first communication system changes after a change of this association to an association of the device with one of a radio node and a cell that has the same first status but belongs to a second communication system that is different from the first communication system, and considering absence of such a change of the identification information at least within a defined time interval after the change of this association as an error.

14. The apparatus according to claim 13, wherein in case that such an absence of a change of the identification information at least within the defined time interval after the change of this association is detected, the process for at least one of collecting and providing fingerprint information is controlled so that at least identification information of at least one of a radio node and a cell having the first status is not at least one of collected and provided after such change of association at least within a time interval that has one of a defined length and an end marked by a detection that the change of the identification information for the at least one of a radio node and a cell for which the identification information is not at least one of collected and provided has occurred.

15. The apparatus according to claim 5, wherein a check of the at least one check comprises checking if at least a part of respective identification information for identifying an area that comprises one of a radio node and a cell is different in at least two sets of fingerprint information of the at least one set of fingerprint information, and considering such a difference as an error.

16. The apparatus according to claim 15, wherein in case that such a difference is detected, the process for at least one of collecting and providing fingerprint information is controlled so that at least the part of the identification information is not at least one of collected and provided for at least one of a radio node and a cell.

17. The apparatus according to claim 5, wherein a check of the at least one check comprises checking if respective identification information of one of a radio node and a cell stays the same in at least two sets of fingerprint information, although a difference of respective positions represented by respective position information in these at least two sets of fingerprint information is one of larger and larger-or-equal compared to a pre-defined threshold, and considering a confirmative result of the checking as an error.

18. The apparatus according to claim 17, wherein in case of such a confirmative result of the checking, the process for at least one of collecting and providing fingerprint information is controlled so that at least no identification information is at least one of collected and provided at least for at least one of a radio node and a cell during a pre-defined state of device.

19. The apparatus according to claim 17, wherein in case of such a confirmative result of the checking, the process for at least one of collecting and providing fingerprint information is controlled so that at least identification information pertaining to at least one of a radio node and a cell of a class that equals a class of the one of a radio node and a cell, for which the checking yielded a confirmative result, is only at least one of collected and provided upon a detection that the at least one of a radio node and a cell of this class is part of a set of at least one of a radio node and a cell of this class observed at a position of the device, which set is considered to have changed with respect to a previous set.

20. An apparatus comprising at least one processor and at least one memory including computer program code, the at least one memory and the computer program code configured to, with the at least one processor, cause an apparatus at least to perform:
one of providing and causing to be provided a representation of at least one check to be performed at least with at least one set of fingerprint information to determine if the at least one set of fingerprint information contains at least one error, wherein the at least one set of fingerprint information comprises identification information for identifying at least one of a radio node and a cell observed at at least one position of a device, and
one of providing and causing to be provided control instructions for controlling a process for collecting fingerprint information based at least on a result of the at least one check, such that the collecting fingerprint information is modified in response to the controlling of the process.

21. A method comprising:
one of producing and obtaining at least one set of fingerprint information, wherein the at least one set of fingerprint information comprises identification information for identifying at least one of a radio node and a cell observed at at least one position of a device;
performing at least one check at least with the at least one set of fingerprint information to determine if the at last one set of fingerprint information contains at least one error; and
controlling a process for collecting fingerprint information based at least on a result of the at least one check, such that collecting fingerprint information is modified in response to the controlling of the process.

* * * * *